Sept. 25, 1956 R. C. GOERTZ ET AL 2,764,301
REMOTE CONTROL MANIPULATOR
Filed April 12, 1955 17 Sheets-Sheet 1
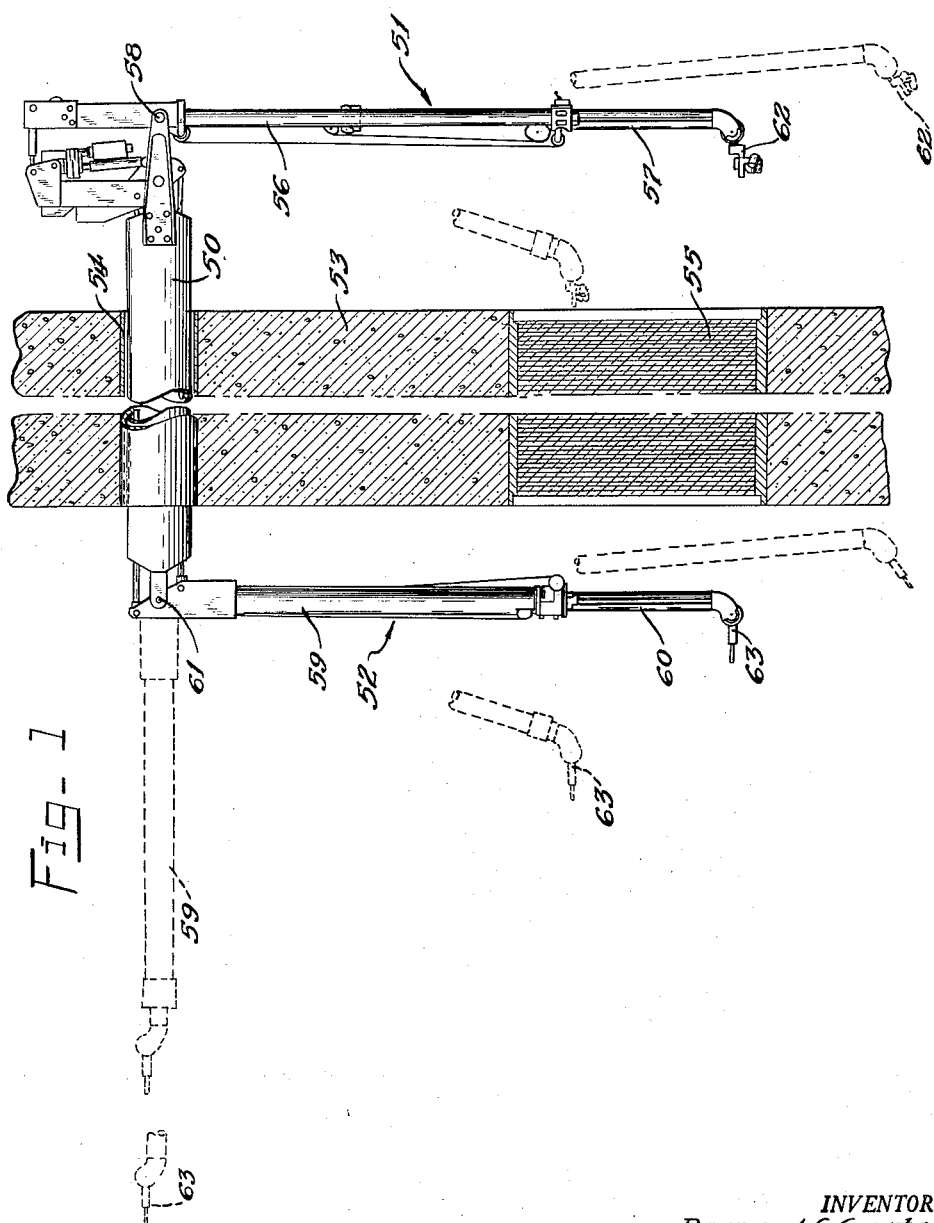
INVENTORS
Raymond C. Goertz
Roland G. Schmitt, Jr.
Robert H. Olsen
By Roland A. Anderson
Attorney

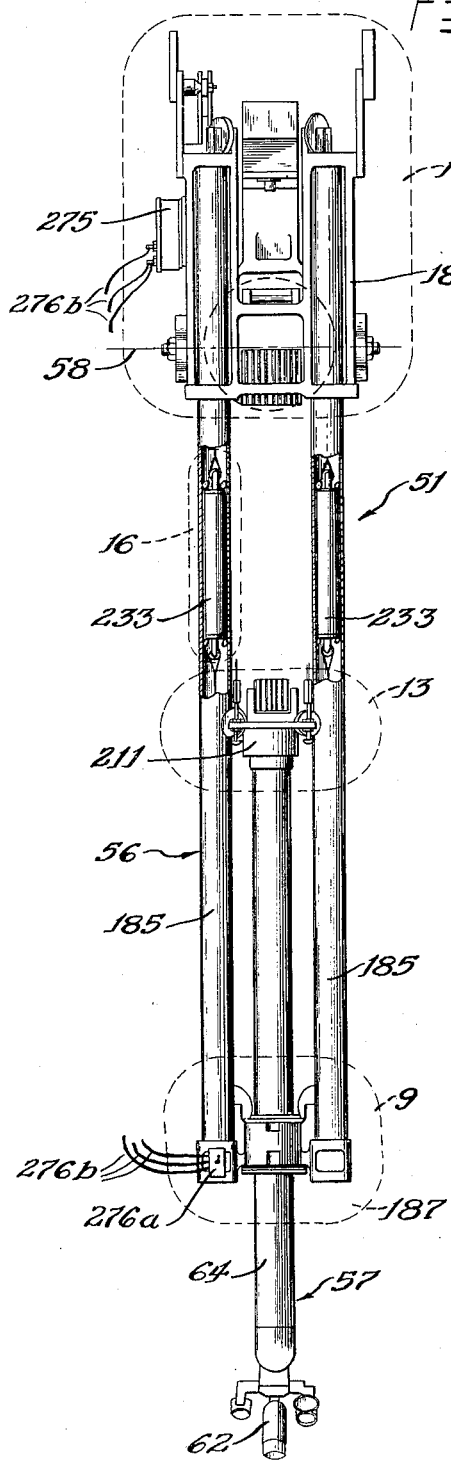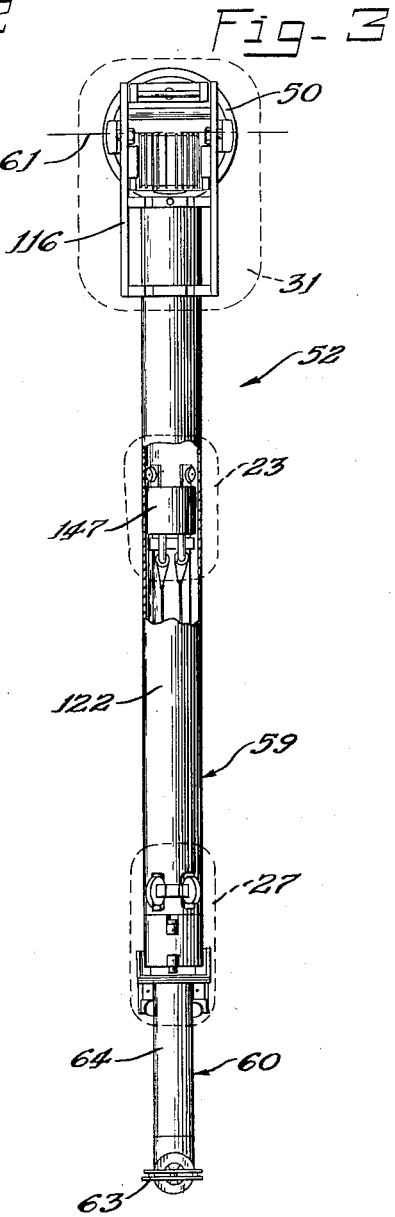

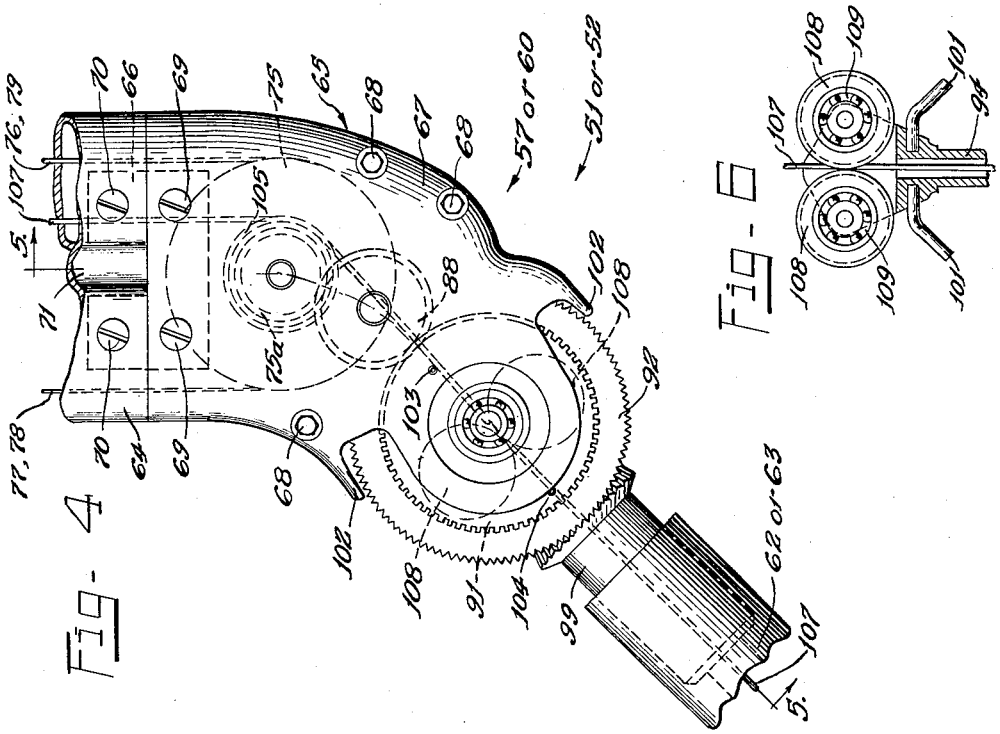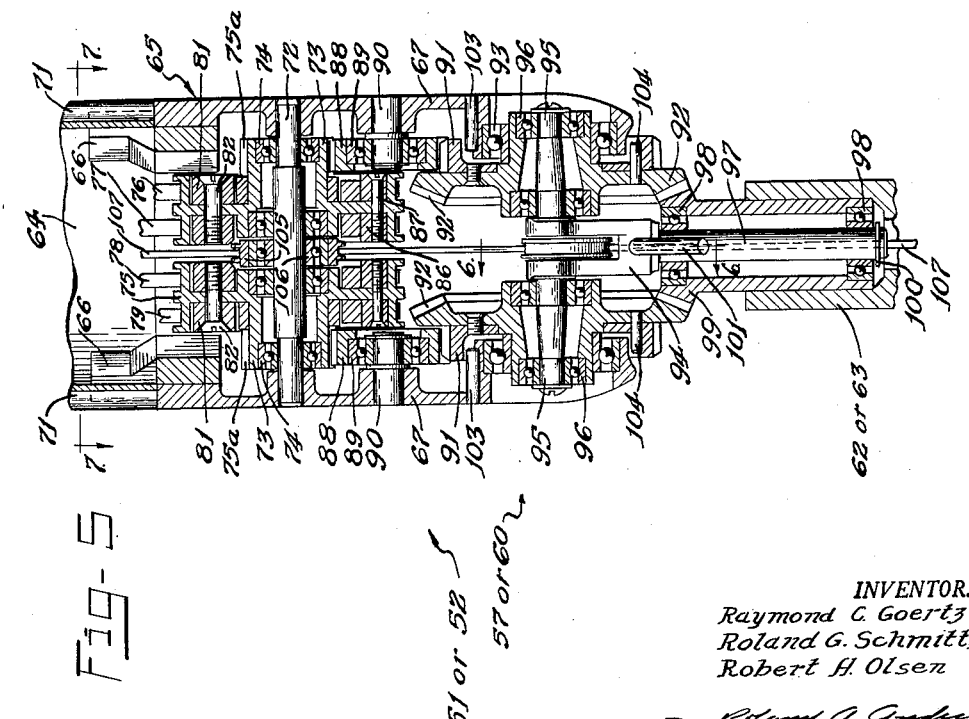

Sept. 25, 1956 R. C. GOERTZ ET AL 2,764,301
REMOTE CONTROL MANIPULATOR
Filed April 12, 1955 17 Sheets-Sheet 4

INVENTORS
Raymond C. Goertz
Roland C. Schmitt, Jr.
Robert H. Olsen

By Roland A. Anderson
Attorney

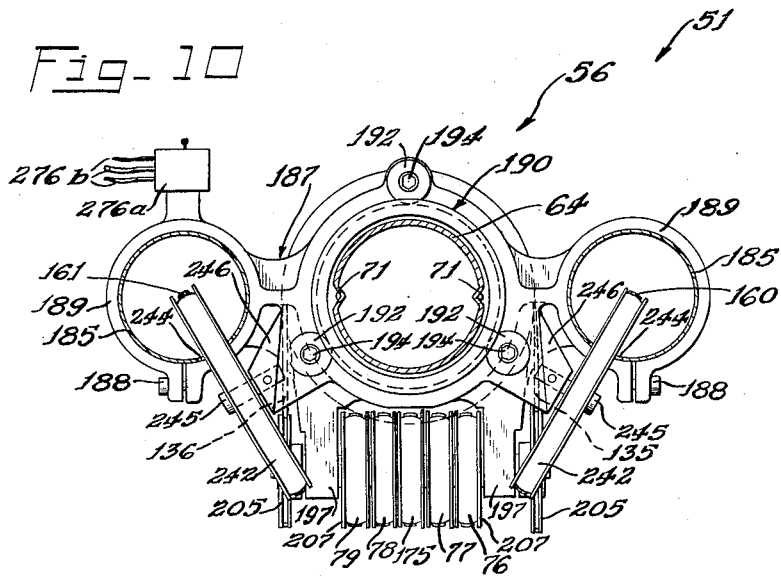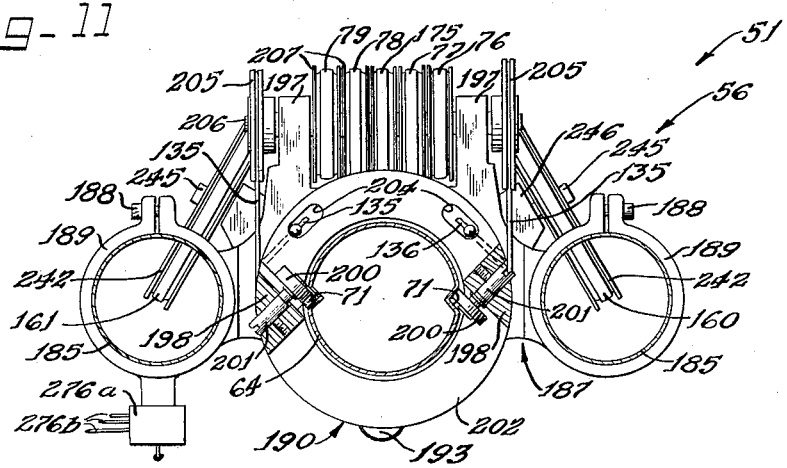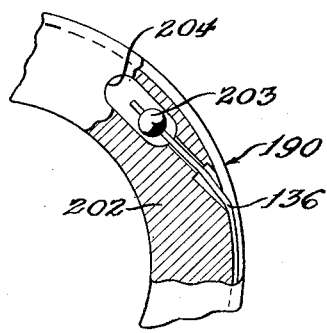

Sept. 25, 1956  R. C. GOERTZ ET AL  2,764,301
REMOTE CONTROL MANIPULATOR
Filed April 12, 1955  17 Sheets-Sheet 6
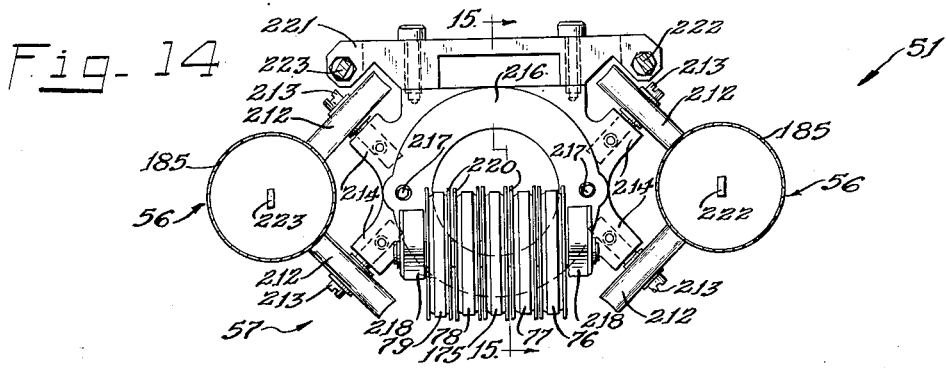
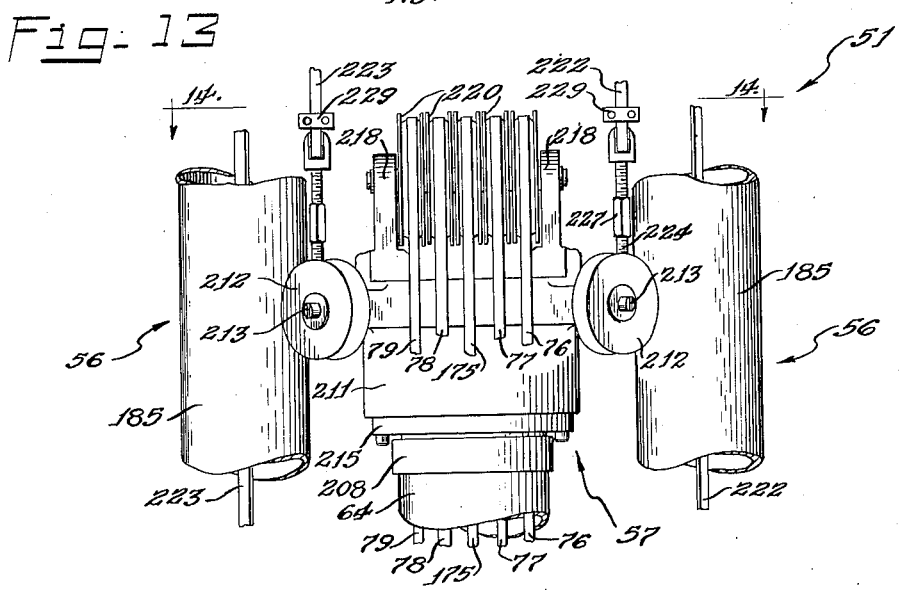
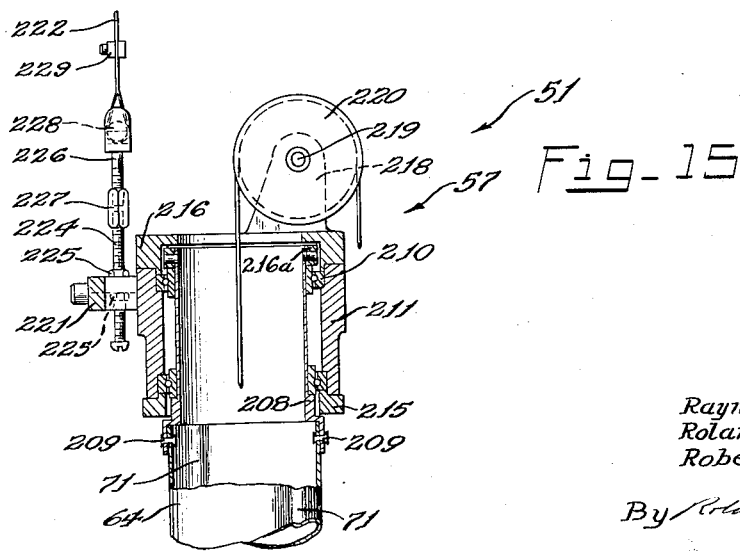
INVENTORS
Raymond C. Goertz
Roland G. Schmitt, Jr.
Robert H. Olsen
By Roland A. Anderson
Attorney

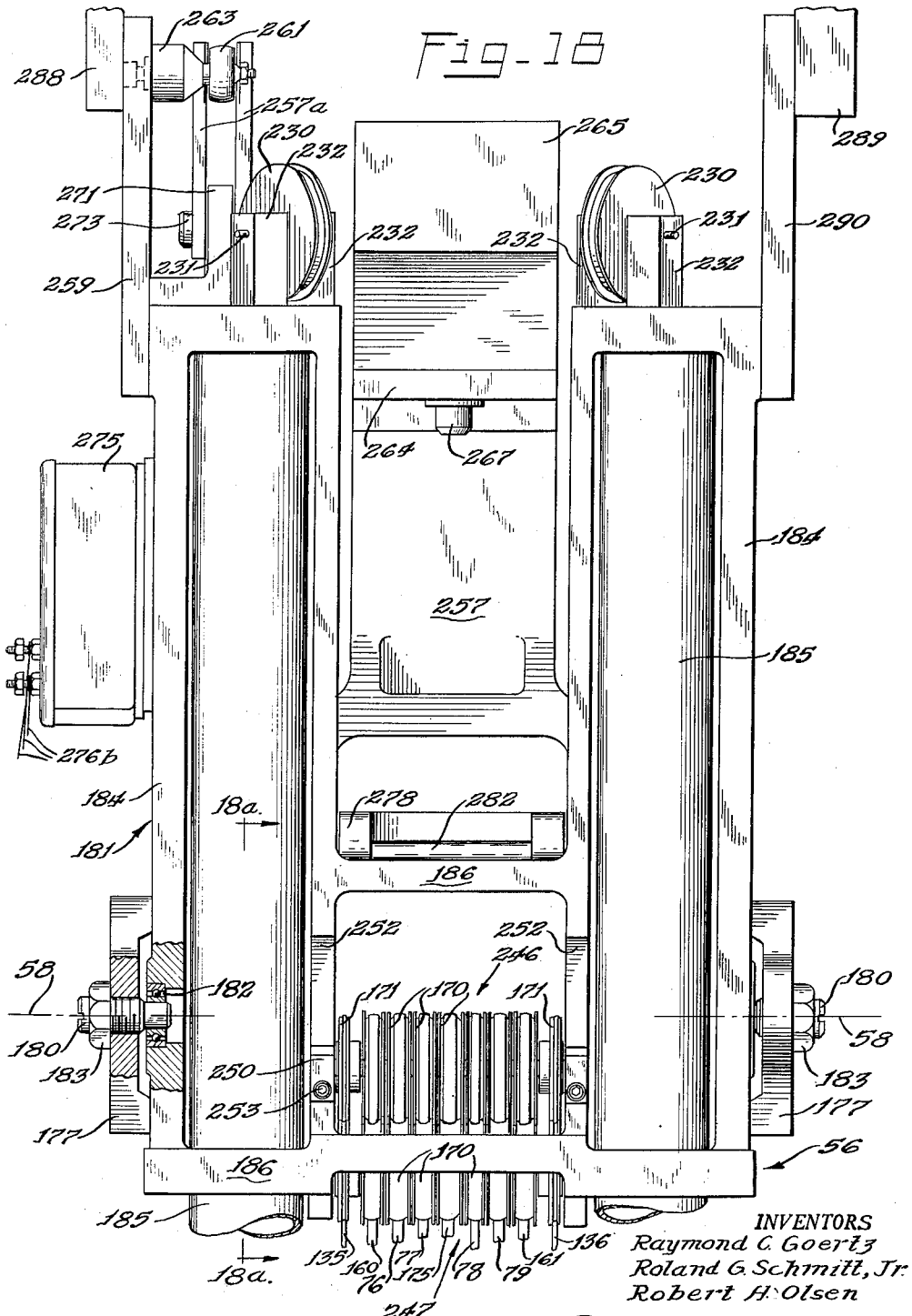

Sept. 25, 1956     R. C. GOERTZ ET AL     2,764,301
REMOTE CONTROL MANIPULATOR
Filed April 12, 1955     17 Sheets-Sheet 8
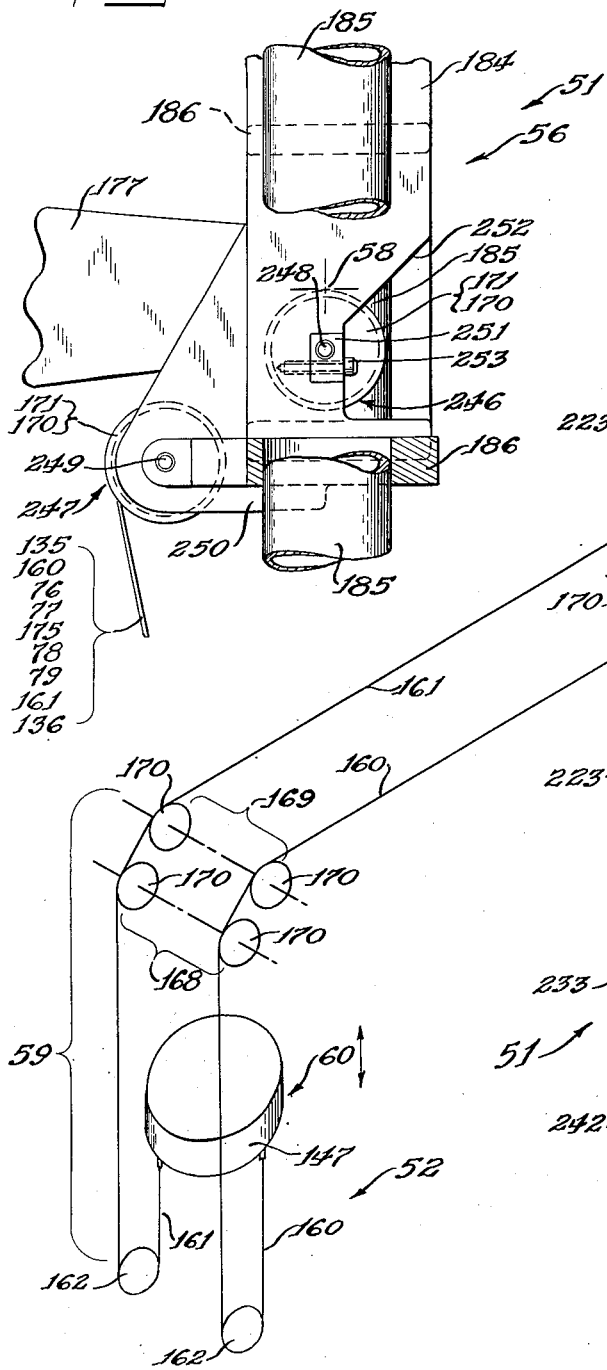
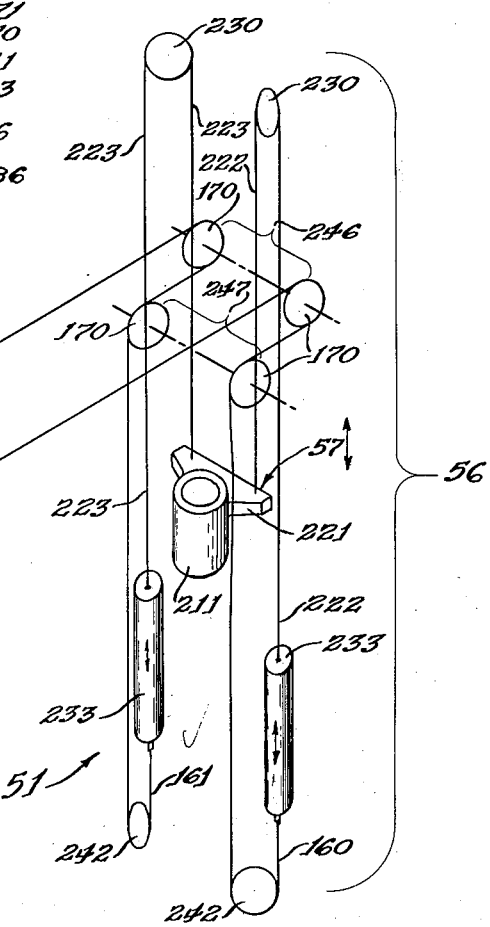
INVENTORS
Raymond C. Goertz
Roland G. Schmitt, Jr.
Robert H. Olsen
By Roland A. Anderson
Attorney

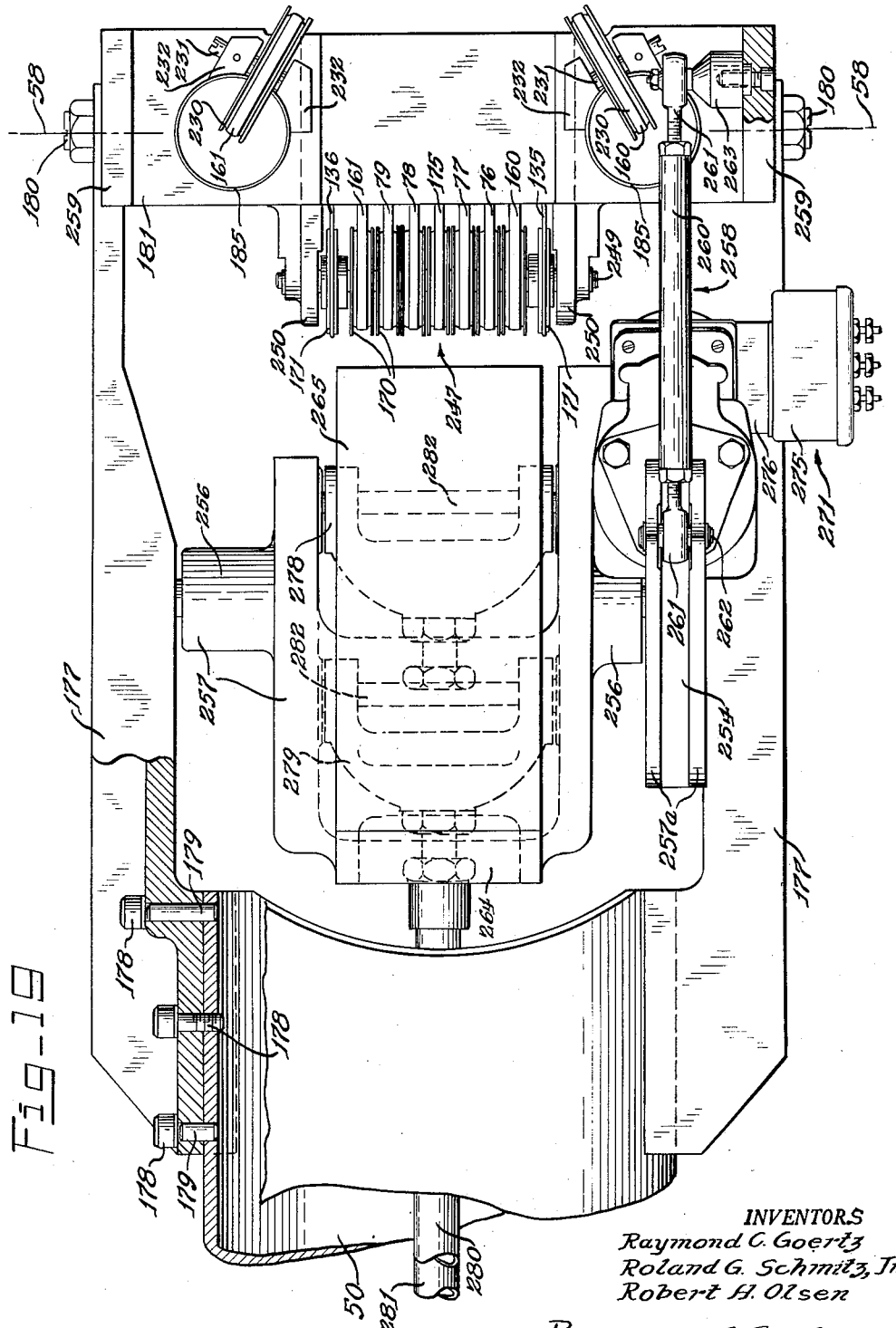

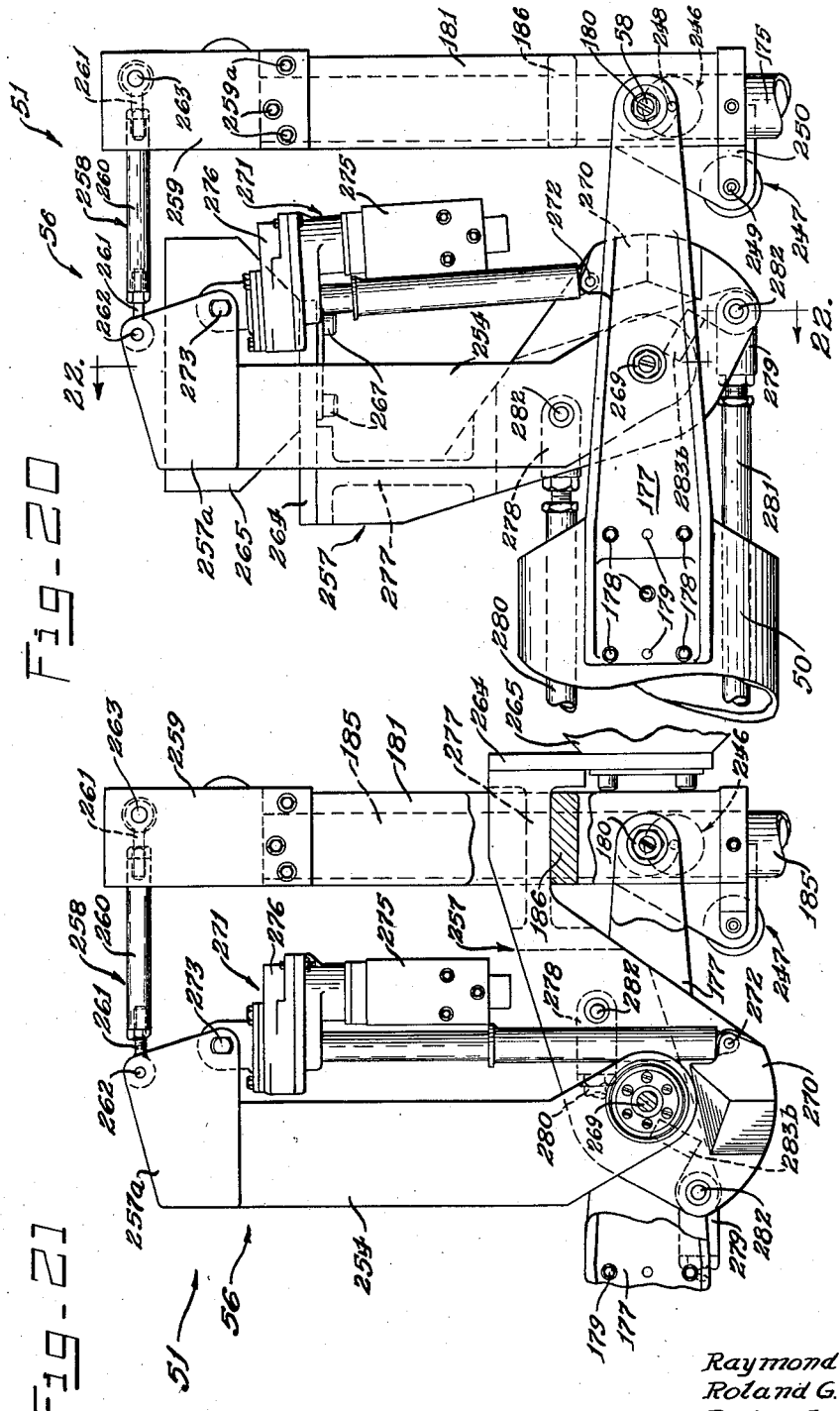

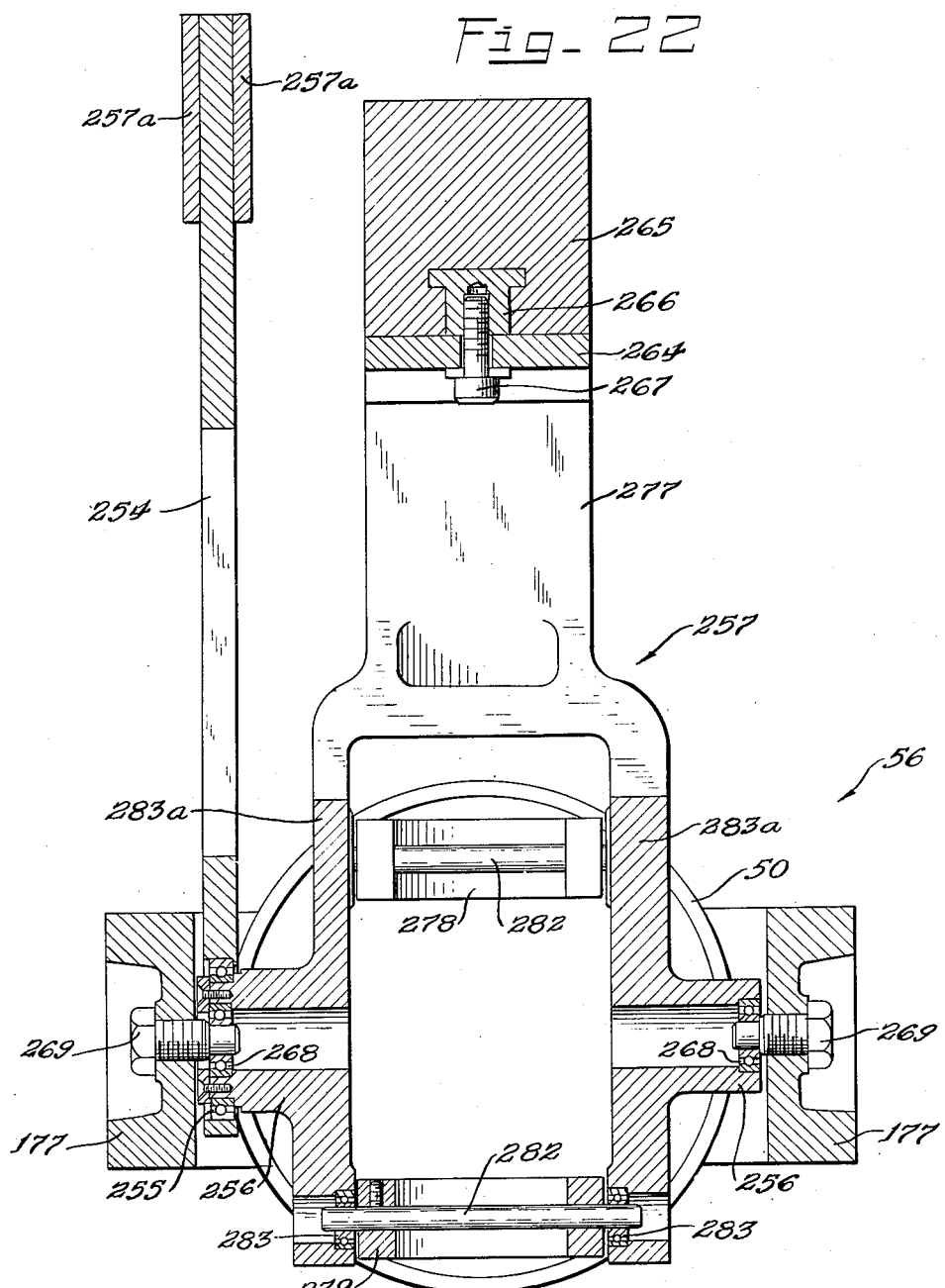

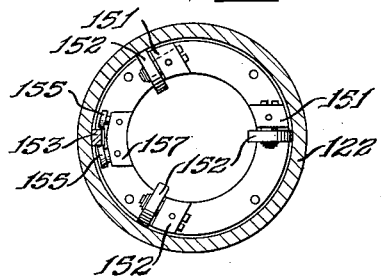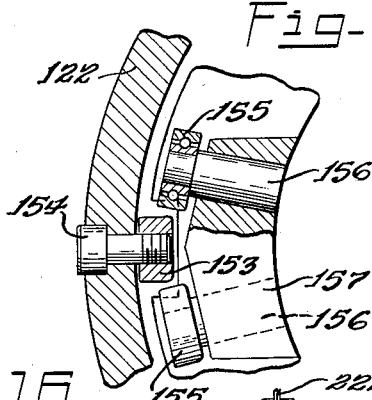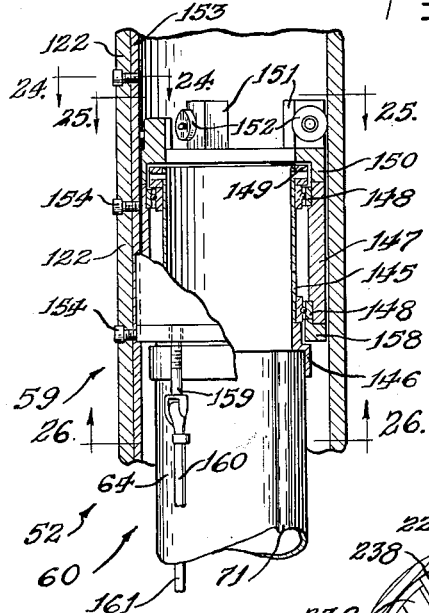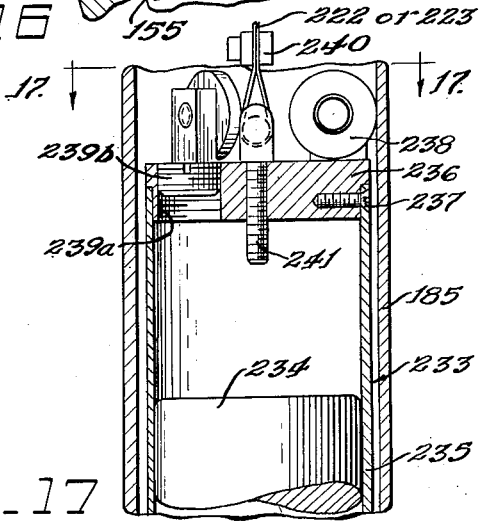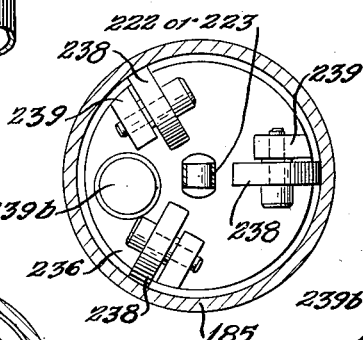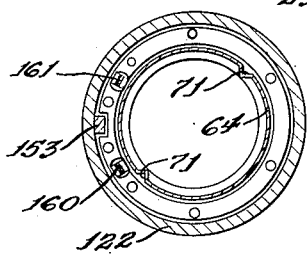

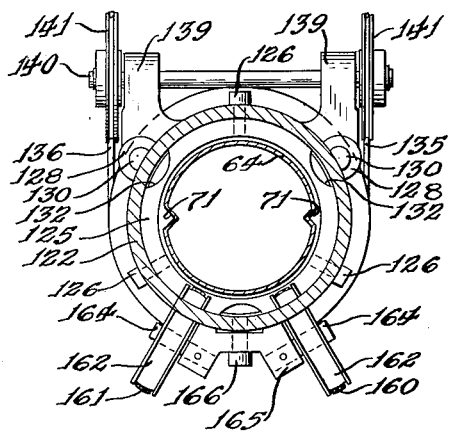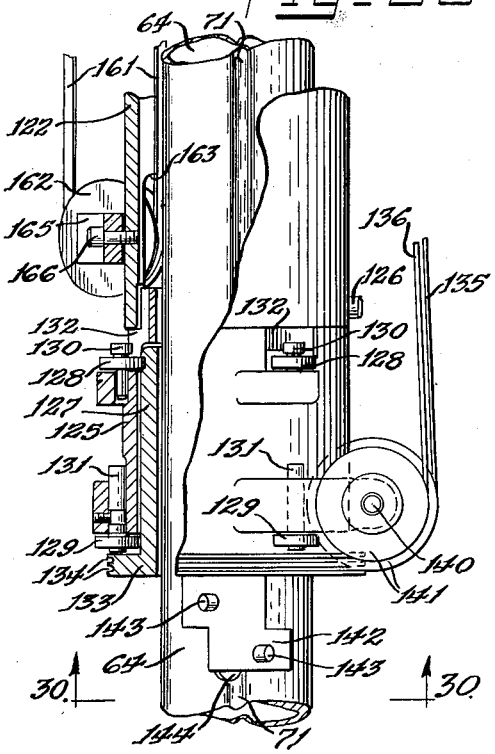

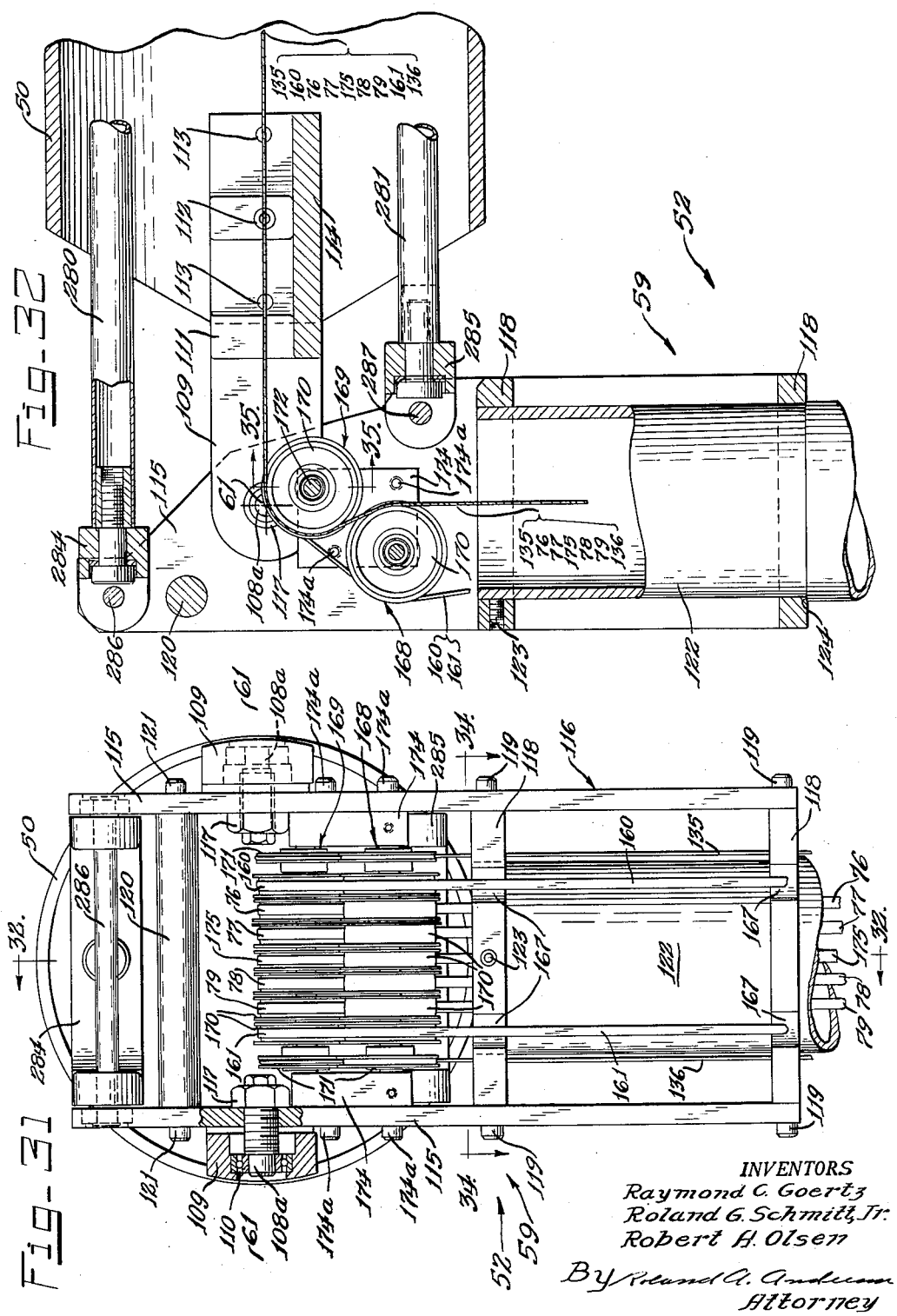

Sept. 25, 1956     R. C. GOERTZ ET AL     2,764,301
REMOTE CONTROL MANIPULATOR
Filed April 12, 1955     17 Sheets-Sheet 15
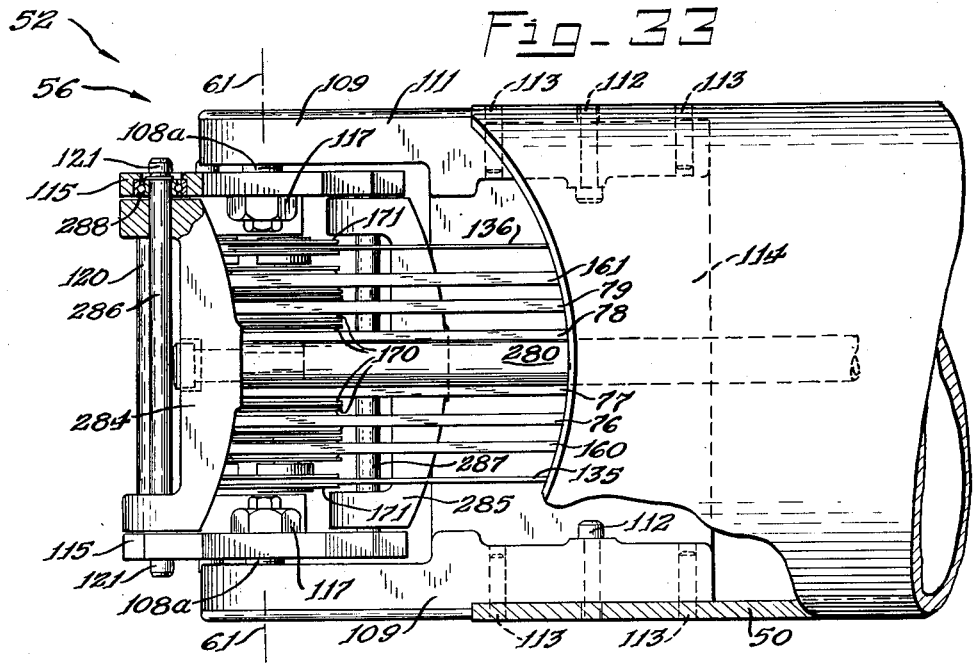
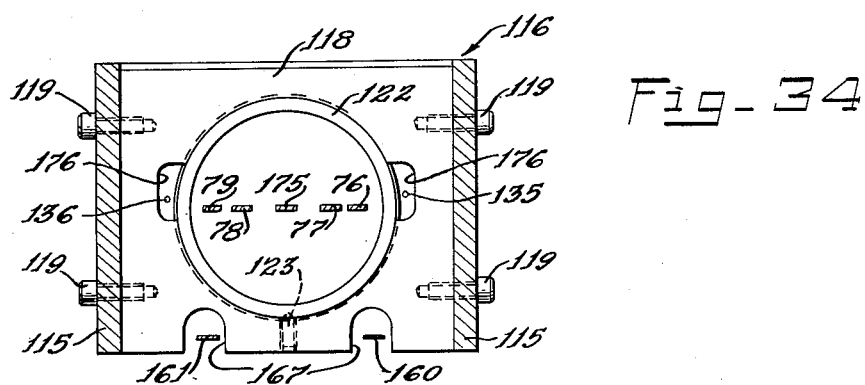
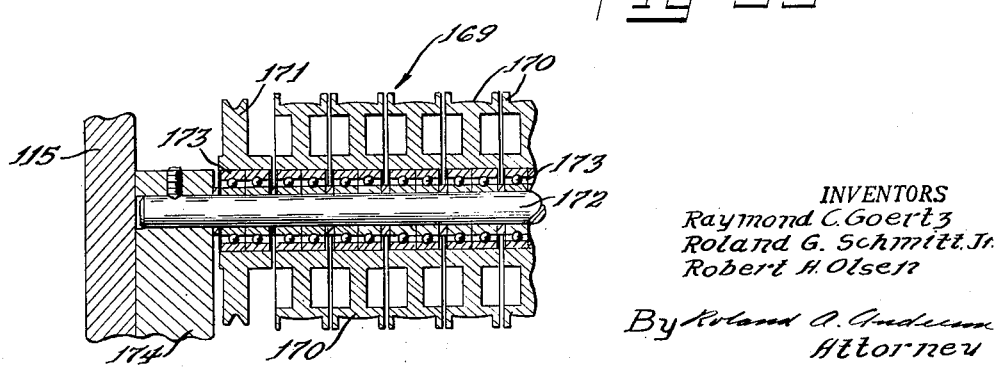
INVENTORS
Raymond C. Goertz
Roland G. Schmitt, Jr.
Robert H. Olsen
By Roland A. Anderson
Attorney

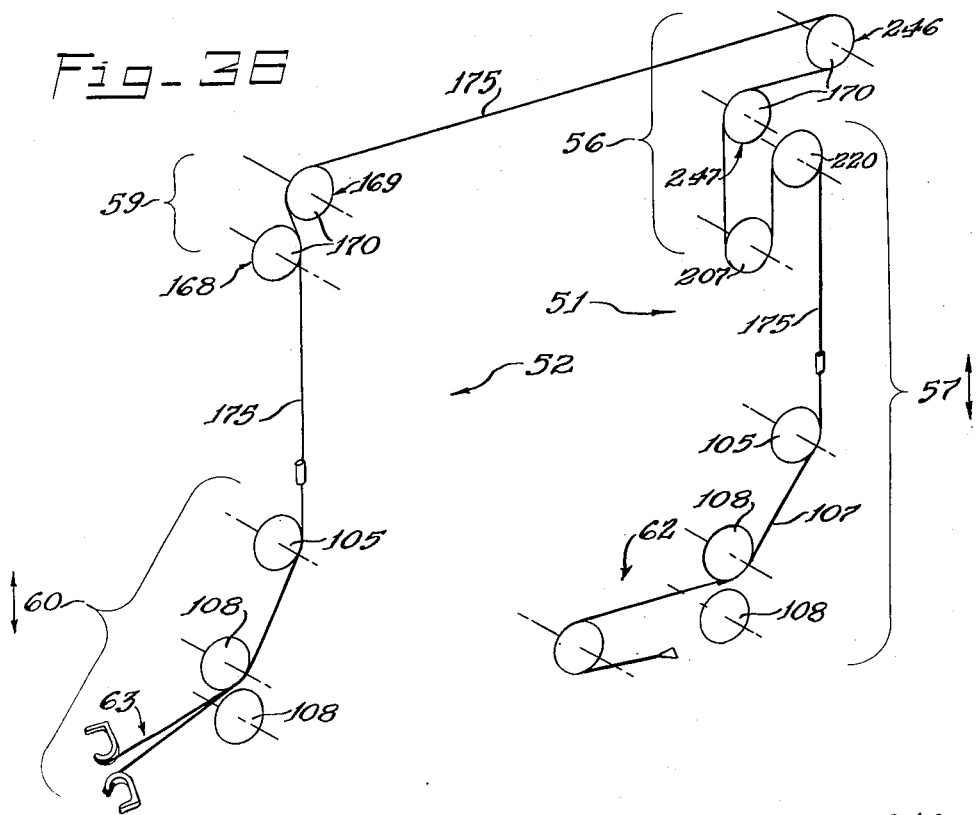
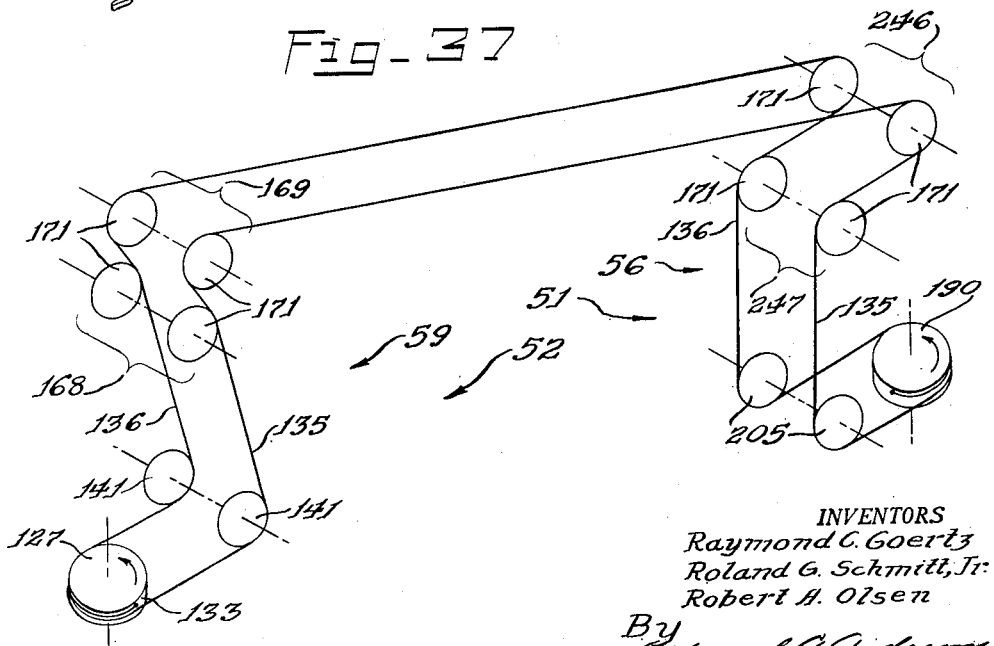

Sept. 25, 1956     R. C. GOERTZ ET AL     2,764,301
REMOTE CONTROL MANIPULATOR

Filed April 12, 1955     17 Sheets-Sheet 17

INVENTORS
Raymond C. Goertz
Roland G. Schmitt, Jr.
Robert A. Olsen

BY Roland A. Anderson
Attorney

United States Patent Office 2,764,301
Patented Sept. 25, 1956

2,764,301

REMOTE CONTROL MANIPULATOR

Raymond C. Goertz, Lemont, Ill., Roland G. Schmitt, Jr., Fort Worth, Tex., and Robert A. Olsen, Lemont, Ill., assignors to the United States of America as represented by the United States Atomic Energy Commission Application April 12, 1955, Serial No. 501,008

15 Claims. (Cl. 214—1)

This invention relates to a remote-control manipulator of the type by which movements of a handle engaged by an operator are reproduced in a claw or grasper engaging an article to be manipulated. More specifically, the handle and grasper are connected to the lower ends of vertical master and slave arms mounted on the ends of a horizontal support.

It is contemplated that a remote-control manipulator will have to extend through and operate on both sides of a wall barrier, because the claw or grasper performs its manipulations in a dangerous area and the handle will be engaged by a human hand in a safe area separated and shielded from the dangerous area by the wall barrier.

In installing a manipulator for use there are some drawbacks in providing the slave and master arms separately in the dangerous and safe areas and then connecting them to the support in the wall barrier. According to the present invention, the slave arm is connected to the support and is then inserted from the safe area through the wall barrier to the dangerous area as the support is brought into place in the wall barrier. Such a mode of installation is made possible by an arrangement and construction in which the slave arm extends in only one direction from its connection with the support, i. e., toward the grasper or claw and can be pivoted independently of the master arm into alignment with the support for insertion through the wall barrier. An additional advantage of this arrangement is that less headroom in the dangerous area is required for operation of the slave arm and the attached claw.

The same general arrangement is applied to the master arm, for its connection with the support is quite near one end of the master arm, and almost all of the master arm lies to one side of its connection with the support.

Other advantages and features of the present invention will be obvious from the specification and the drawings in which:

Fig. 1 is an elevational view, partly in section, showing the remote-control manipulator of the present invention mounted in a shielding wall;

Fig. 2 is an elevational view with parts broken away, of a master arm of the manipulator;

Fig. 3 is an elevational view, with parts broken away, of a slave arm of the manipulator;

Fig. 4 is an elevational view of a wrist joint used to connect the handle to the master arm or the gripper arm to the slave arm;

Fig. 5 is a sectional view taken on the line 5—5 of Fig. 4, showing details of the wrist joint;

Fig. 6 is a sectional view taken on line 6—6 of Fig. 5;

Fig. 10 is a horizontal sectional view taken in a downward direction on the line 10—10 of Fig. 9;

Fig. 11 is a horizontal sectional view taken in an upward direction on the line 11—11 of Fig. 9;

Fig. 12 is a fragmentary view showing a portion of the structure of Fig. 11, more particularly the attachment of a cable to the tubular structure of the master arm;

Fig. 13 is a fragmentary view showing the portion of the master arm within the area 13 in Fig. 2 but from the back, more particularly the upper end of the vertically movable structure and an intermediate portion of the vertically fixed bracket;

Fig. 14 is a horizontal sectional view taken along the line 14—14 of Fig. 13;

Fig. 15 is a vertical sectional view taken along the line 15—15 of Fig. 13;

Fig. 16 is a fragmentary vertical section showing the portion of the master arm within the area 16 in Fig. 2, more particularly a counterweight and a portion of the vertically fixed bracket in which the counterweight moves;

Fig. 17 is a horizontal sectional view taken on the line 17—17 of Fig. 16;

Fig. 18 is an end view showing the portion of the master arm within the area 18 in Fig. 2, more particularly, the upper end of the master arm;

Fig. 18a is a vertical sectional view taken on the line 18a—18a of Fig. 18 and showing mountings for pulleys adjacent the pivot for the master arm;

Fig. 19 is a plan view, with parts broken away, of the master arm, the adjacent end of the horizontal support, and mechanism adjustably interconnecting the master arm and the slave arm;

Fig. 20 is an elevational view showing the upper end of the master arm, the adjacent end of the support, and the said mechanism adjusted to hold the arms parallel;

Fig. 21 is an elevational view similar to Fig. 20 but showing said mechanism adjusted to hold the arms at right angles to one another;

Fig. 22 is a vertical sectional view taken on the line 22—22 of Fig. 20 and showing the counterweight for the slave arm mounted adjacent the master arm;

Fig. 23 is a vertical section showing the portion of the slave arm within the area 23 in Fig. 3 but rotated 90° from the position of Fig. 3, more particularly, the upper end of a vertically movable structure and an intermediate portion of a vertically fixed bracket that mounts the movable structure;

Fig. 24 is a horizontal sectional view taken on the line 24—24 of Fig. 23, showing a vertical key on the vertically fixed bracket and rollers on the vertically movable structure engageable with the key to prevent rotation of the movable structure with respect to the fixed bracket;

Fig. 25 is a horizontal sectional view taken from above on the line 25—25 in Fig. 23, showing rollers facilitating vertical movement between the movable structure and the fixed bracket;

Fig. 26 is a horizontal sectional view taken from below on the line 26—26 in Fig. 23;

Fig. 27 is a fragmentary view showing the portion of the slave arm within the area 27 in Fig. 3, more particularly, the lower end of the vertically fixed bracket and a portion of the vertically movable structure;

Fig. 28 is a horizontal sectional view taken from above on the line 28—28 of Fig. 27;

Fig. 29 is a fragmentary view showing the portion of the slave arm shown in Fig. 3, but rotated 90° from the position of Fig. 27;

Fig. 30 is a horizontal sectional view taken from below on the line 30—30 of Fig. 29;

Fig. 31 is a fragmentary vertical view showing the portion of the slave arm within the area 31 in Fig. 3, more particularly, the connection of the upper end of the slave arm to a horizontal support;

Fig. 32 is a vertical sectional view taken on the line 32—32 of Fig. 31;

Fig. 33 is a horizontal view of the portion of the slave arm shown in Fig. 31;

Fig. 34 is a horizontal sectional view taken on the line 34—34 of Fig. 31;

Fig. 35 is a vertical sectional view taken on the line 35—35 of Fig. 32, showing the mounting of tape pulleys at the upper end either of the slave arm or the master arm;

Fig. 36 is a diagrammatic perspective view showing how the opening and closing of the handle or gripper on the master arm causes opening and closing of the gripper on the slave arm;

Fig. 37 is a diagrammatic perspective view showing how rotation of the master arm about a vertical axis produces rotation of the slave arm about a vertical axis;

Fig. 38 is a diagrammatic perspective view illustrating how rotation of the handle about two axes in the base of the master arm produces rotation of the gripper about two axes in the base of the slave arm;

Fig. 39 is a diagrammatic perspective view illustrating how vertical movement of the master arm produces vertical movement of the slave arm; and Fig. 40 is a view similar to Fig. 35 but showing a modified construction in which the shafts for pulley guides are oscillated to reduce friction.

Figure 7:
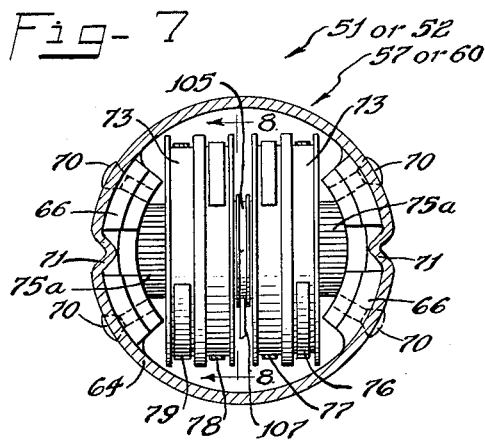
Fig. 7 is a sectional view taken on the line 7—7 of Fig. 5, showing the lower end either of the master arm or the slave arm.

As shown in Fig. 1, the remote-control manipulator of the present invention comprises a horizontal support 50, a master arm 51, and a slave arm 52. The horizontal support 50 is generally horizontal and extends through a generally vertical shielding wall 53, being mounted therein on a sleeve or tube 54 set in the wall. The thickness of the wall and the material thereof will depend upon the shielding purpose of the wall. If the wall is to shield an operator of the manipulator from radioactive emanation, the wall must be constructed of radiation-absorbing material such as concrete and/or iron, and be relatively thick. If the wall is to shield the operator from bacteria or other similar noxious matter, the wall 53 may be relatively thin. The wall is provided with a window 55 which has the same thickness as the wall and may be formed of laminated glass plates. The master and slave arms 51 and 52 are generally vertical and are pivotally connected near or at their upper ends to the horizontal support 50 on opposite sides of the shielding wall 53, the master arm 51 being in a safe area to the right of the wall 53 as viewed in Fig. 1, and the slave arm 52 being to the left of the wall 53 as viewed in Fig. 1.

The master arm 51 comprises a stationary part 56 and a movable part 57, the stationary part being pivotally connected at 58 to the horizontal support, and the movable part 57 being mounted on the stationary part 56 so as to slide therealong toward and away from the pivot 58. Similarly, the slave arm 52 comprises the stationary part 59 and movable part 60, a stationary part being pivotally connected at 61 to the horizontal support 50, and the movable part 60 being mounted on the stationary part so as to be slidable therealong toward and away from the pivot 61. It should be noted that the stationary parts 56 and 59 of the master and slave arms 51 and 52 are not stationary in the strict sense of the word since they may move about their pivots 58 and 61 on the support 50, but the term "stationary" is used to contrast these parts with the movable parts, the stationary parts 56 and 59 being held against movement toward and away from the pivots 58 and 61, the movable parts 57 and 60 being, on the other hand, movable toward and away from these pivots. A handle 62 on the lower end of the movable part 57 of the master arm 51 is engaged by the hand of the operator and by appropriate movements transmitted along the arms 51 and 52, and the support 50 controls the movement of a grasper or claw 63 connected to the lower end of the movable part 60 of the slave arm 52.

It will be noted that the slave arm 52 does not project above the horizontal support 50 and so can be moved into a horizontal position in alignment with the support 50, as shown in dotted lines, when the manipulator is being installed or removed from the wall 53. Since the slave arm 52 does not project above the support 50, little or no headroom is required in the dangerous or contaminated area above the mounting tube 54. The master arm 51 projects only a small amount above the support 50, and so only a limited amount of headroom is required in the safe area above the mounting tube 54.

For a detailed showing and explanation of the handle 62 and grasper 63, reference is made to Goertz et al., Patent No. 2,695,715, dated November 30, 1954, and more particularly to Figs. 2, 3, and 4 thereof for a showing of the handle, and Figs. 5, 6, and 7 thereof for a showing of the grasper.

Figs. 4, 5, 6, and 7 of the present application show a wrist joint by which the handle 62 and the grasper 63 are mounted on the lower ends of the movable parts 57 and 60, respectively. The movable part 57 or 60 includes a tube 64 to the lower end of which a housing 65 for the wrist joint is secured by means of a pair of U-shaped adaptors 66. The housing 65 is formed of complementary halves 67 which are secured to one another by means of a plurality of screws 68 which go through openings in one housing half 67 and are threaded into the other housing half. The housing halves 67 are secured to the bases of the adaptors 66 by screws 69, and the legs of the adaptors are secured to the tubes 64 by screws 70. The adaptors 66 engage the interiors of the housing halves 67 and the tube 64, and the spaces between the legs of the adaptors accommodate diametrically opposed grooves 71 which are formed in the exterior of the tube 64 and extend the length thereof. The purpose of these grooves will be described later.

Figure 8:
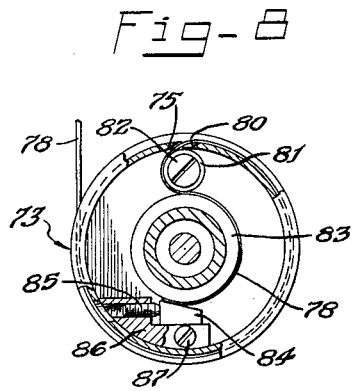
Fig. 8 is a sectional view taken on the line 8—8 of Fig. 7, showing the attachment of a tape to a drum.

The housing halves 67 receive the ends of shaft 72 on which is mounted a pair of members 73 by means of two pairs of ball bearings 74. Each member 73 has a pair of take-up sections 75 and a spur-gear section 75a. The four take-up sections 75 in the form of a drum receive four metal tapes 76, 77, 78, and 79, which have ends anchored in the take-up sections as shown in Fig. 8. As seen in this figure, tape 78 extends a substantial amount around one of the sections 75 and goes through an opening 80 formed therein and thence about a ring 81 secured by a screw 82 and halfway about a hub 83 formed on the member 73. The end of the tape 78 is clamped against the hub 83 by means of a wedge 84 which is held against the tape and the hub by means of a socket screw 85, having threaded engagement with the interior of a block 86 secured by a screw 87 to the member 73. As seen in Fig. 7, the tapes 76 and 77 are wrapped in opposite directions around the take-up section 75 of the one member 73, and thus if the tape 76 extends counter-clockwise toward its clamped end as viewed in Fig. 8, a corresponding view of the tapes 77 and the take-up section 75 to which it is attached would show the tape 77 to extend clockwise toward its attached end. The tapes 78 and 79 are clamped to the other member 73 and extend in opposite directions about the take-up sections 75 thereof. As seen in Fig. 5, for each member 73 there is a single screw 82 attaching the two rings 81 to the member 73 and there is a single screw 87 attaching the two blocks 86 to the member 73.

The spur-gear section 75a of the members 73 mesh with idler gears 88 journaled by means of ball bearings 89 on shafts 90 mounted in the housing halves 67. The idler gears 88 in turn mesh with spur gears 91 which are secured to beveled differential gears 92 journaled by ball bearings 93 in the housing halves 67. A yoke 94 has trunnions 95 which are journaled in the differential gears 92 by means of two pairs of ball bearings 96. The yoke 94 also has a shaft 97 which by means of two ball bearings 98 journals a bevel gear 99 which is in mesh with the differential gears 92. The bevel gear 99 is held in mesh with the differential gears 92 by means of a snap ring 100 which is at the lower side of the lower ball bearing 98. Angular movement of the yoke 94 about the trunnions 95 is limited by means of pegs 101 inserted into and secured to the yoke, as shown in Fig. 6. When the pegs 101 engage ears 102 formed on the housing halves 67, the yoke can swing no farther. The handle 62 or the grasp 63 is secured to the bevel gear 99. Pegs 103 which are set in the housing halves 67 lie in the paths of pegs 104 which are set in the differential gears 92. Engagement of the pegs 104 with the pegs 103 limits the angular movement of the differential gears 92 in both directions, and since the take-up sections 75 are geared to the differential gears 92, the angular movement of the take-up sections 75 is limited so that the tapes 76, 77, 78, and 79 are protected from being bent back upon themselves at the openings 80 in the take-up sections 75. A guide pulley 105 is journaled on the shaft 72 by means of a ball bearing 106 between the members 73. The pulley 105 is engaged by a cable 107 which extends thereover and between two guide pulleys 108 journaled by ball bearings 109 on the yoke 94, as shown in Fig. 6. The cable 107 extends from the pulleys 108 through the shaft 97 of the yoke 94 to the handle 62 or grasper 63 to which it is connected in the manner disclosed more fully in the aforementioned Goertz et al. Patent No. 2,695,715. Because of the proportions of the take-up sections 75, the spur-gear sections 75a, the spur gears 91, and the differential gears 92, the tapes 76, 77, 78, and 79 move about twice as far as points on the pitch circles of the differential gears 92, and thus the load transmitted to the tapes is about half that imposed at the differential gears. This enables the manipulator of the present invention to take greater loads.

Reference is now made to Figs. 31, 32, and 33 for a showing of the construction by which the slave arm 52 is connected to the support 50. As previously stated, the stationary part 59 of the slave arm is connected to the support 50 for movement about a pivot 61. This pivot is formed by a pair of threaded stub shafts 108a and a pair of ears 109 in which the shafts 108a are journaled by means of ball bearings 110. The ears 109 form part of a yoke 111 which is secured within one end of the support 50 by means of fastening screws 112. Locating pins 113 which extend into the end of the support 50 and yoke 111 help to position the yoke with respect to the support. The yoke 111 has a web portion 114 which interconnects the ears 109.

The stub shafts 108a have threaded engagement with vertical side pieces 115 forming part of a framework 116 which constitutes the upper end of the stationary part 59 of the slave arm 52. Jam nuts 117 threaded on the shafts 108a hold them against movement with respect to the side pieces 115. The framework 116 also includes horizontal cross pieces 118 to which the vertical side pieces 115 are secured by screws 119. The cross pieces 118 extend between the intermediate and lower portions of the side pieces 115, and a spacer rod 120 extends between the upper portions of the side pieces 115 to hold them apart. Reduced ends 121 on the spacer rod 120 fit in openings in the side pieces 115, and the shoulders formed between the end portions 121 and the body portion of the spacer rod engage the side pieces 115. The framework 116 is secured to the upper end of a tubular guide 122 which also forms part of the stationary part 59 of the slave arm 52. The upper cross piece of the framework 116 is secured to the upper end of the tubular guide 122 by means of a set screw 123 and the lower cross pieces 118 rest against a shoulder 124 formed on the tubular guide 122.

As shown in Figs. 27 to 30, a bracket 125 is secured to the lower end of the tubular guide 122 by means of a plurality of screws 126, which pass through the tubular guide 122 and have threaded engagement with a portion of the bracket 125 fitting within the lower end of the tubular guide. A long ring 127 is rotatably mounted within the bracket 125 by means of an upper set of rollers 128 and a lower set of rollers 129. The rollers are journaled in the bracket 125, the upper set 128 being headed stub shafts 130 and the lower set 129 being headed stub shafts 131. The upper rollers 128 extend through recesses 132 in the bracket 125 and an external groove in the upper end of the ring 127 so as to retain the same in the bracket 125. The lower rolls 129 are positioned below the bracket 125 so as to engage portions of the ring 127 extending beyond the bottom of the bracket 125. The lower end of the ring 127 is provided with an enlarged take-up portion 133 carrying two grooves 134, which receive cables 135 and 136, the ends of which are anchored in passages formed in the take-up portion 133 by means of hollow members 137 in which the end portions of the cables 135 and 136 are secured. The members 137 are applied to the cable ends through openings 138 formed in the pulley portion 133 at the ring 127 and prevent the cable ends from being pulled out, because the members 137 are too large to go through the passages in the take-up portion 133 in which the cable ends lie. The bracket 125 has laterally protruding portions 139 which provide bearings for a shaft 140 on which guide pulleys 141 are mounted so as to guide the cables 135 and 136 vertically away from the horizontal grooves 134 in the ring 127. The lower end of the ring 127 has two diametrically opposed axial extensions beyond the take-up portion 133. The extensions 142 provide mountings for four shafts 143 which carry four rollers 144. The rollers 144 have axes lying in planes normal to the axis of the tube 64 and engage the sides of the grooves 71 formed in the tube 64. For each groove 71 one roller 144 engages one side of the groove, and the other roller 144 on the same extension 142 engages the other side of the same groove, the two rollers lying in planes generally perpendicular to one another. The rollers 144 constitute a means for keying the tube 64 to the ring 127, whereby a rotational movement of the tube 64 with respect to the ring 127 is prevented and axial movement of the tube 64 with respect to the ring 127 is permitted.

Reference is now made to Figs. 23 to 26. To the upper end of the tube 64 of the slave arm 52 there is secured a short tubular section 145 by means of an adaptor ring 146, which is attached to the tube 64 by screws (not shown) and to the tubular section 145 by brazing or welding. The tubular section 145, which is smaller in diameter than the tube 64, is journaled for rotation in a head 147 by means of ball bearings 148. The bearings 148, a collar 149, secured to the upper end of the tubular section 145, and a shoulder formed on the adaptor ring 146 prevent axial movement of the tube 64 and the tubular section 145 with respect to the head 147. A ring 150 carrying a plurality of upstanding posts 151 is secured to the upper end of the head 147. The posts 151 carry rollers 152 which ride on the interior of the tubular guide 122 so as to permit the head 147 movement along the axis of the tubular guide 122. Any appreciable rotational movement of the head 147 with respect to the tubular guide 122 is prevented by means of an axial key 153 secured to the interior of the tubular guide 122 by screws 154 and a pair of rollers 155 engageable with the key 153 and journaled on shafts 156 set in an upstanding post 157 formed on the ring 150.

A ring 158 is secured to the lower end of the head 147 and carries a pair of depending hangers 159 which have bifurcated lower ends carrying pins extending through loops on the ends of tapes 160 and 161. As shown in Figs. 27, 28, and 29, these tapes extend downwardly from the hangers 159 between the tube 64 and the tubular guide 122 over guide pulleys 162 out through openings 163 formed in the tubular guide 122 and upwardly along the exterior of said tubular guide. The pulleys 162 project through the openings 163 into the interior of the tubular guide 122 and are mounted on shafts 164 secured to a bracket 165 attached to the tubular guide 122 by a screw 166. As shown in Figs. 31 to 34, the tapes 160 and 161 extend through slots 167 formed in the cross pieces 118 of the framework 116 and over pulleys of pulley sets 168 and 169.

Each pulley set comprises seven wide crowned guide pulleys 170 and two narrow grooved guide pulleys 171 positioned at opposite sides of the wide pulleys 170. As is illustrated for the pulley set 169 in Fig. 35, each of the pulleys 170 and 171 is rotatably mounted upon a fixed shaft 172 by means of ball bearings 173, and the shaft 172 has its ends secured in blocks 174 attached to the inner sides of the vertical side pieces 115 of the framework 116 by means of screws 174a (Fig. 31). If the pulleys of the sets 168 and 169 are numbered from right to left as viewed in Figs. 31 and 35, the tapes 160 and 161 engage the first and seventh wide pulley 170 of each of the pulley sets 168 and 169, the tapes 76, 77, 78, and 79 engage the second, third, fifth, and sixth wide pulleys of each set, and the cables 135 and 136 engage the narrow pulleys 171 at the right and at the left of each set. The fourth or middle wide pulley 170 of each set is engaged by a metal tape 175 which interconnects the cables 107 which control opening and closing of the handle 62 and the grasper 63, as shown in Fig. 36. The cables 135 and 136 and the tapes 76, 77, 78, 79, and 175 engage the pulleys 170 and 171 of the pulley set 168 on the sides thereof toward and adjacent the pulley set 169, which sides are to the right as viewed in Fig. 32 or are the far sides as viewed in Fig. 31. Thus as shown in Fig. 32, the cables 135 and 136 and the tapes 76, 77, 78, 79, and 175 have the portions between the pulley sets 168 and 169 displaced about 110° from the horizontal portions of these tapes extending horizontally through the horizontal support 50 when the slave arm 52 is vertical and perpendicular to the support 50. When, as shown in Fig. 32, the slave arm 52 is vertical and extends at right angles to the support 50, the uppermost surface portions of the pulleys 170 and 171 lie on the pivot 61 of the slave arm 52 on the support 50, that is, the center line of the threaded shafts 108a by which the slave arm is pivotally mounted on the yoke 111. The tapes 160 and 161 engage the wide pulleys 170 of the pulley set 168 on the sides thereof away from the pulley set 169, that is, to the left as viewed in Fig. 32, and toward the viewer in Fig. 31. The cables 135 and 136 go through recesses 176 in the cross pieces 118 of the framework 116, as shown in Fig. 34.

Attention is now directed to Figs. 18 to 22, which illustrate the connection of a master arm 51 to the horizontal support 50 on the pivot 58. As shown in Figs. 19 and 20, a pair of legs 177 is attached to one end of the horizontal support 50 by means of two sets of five screws 178 and of two locating pins 179. The legs 177 project beyond the end of the horizontal support at 50 and carry threaded stub shafts 180 upon which a frame 181 is journaled by means of ball bearings 182, as illustrated in Fig. 18. The shafts 180 have their axes coincident with the pivot 58 of the master arm 51 on the horizontal support 50. Each shaft 180 has threaded engagement with one of the legs 177 and is held against movement therein by means of a jam nut 183. The frame 181 forms a part of the stationary part 56 of the master arm 51 and is generally in the shape of a U having open or hollow vertical legs 184, and a horizontal base formed of vertically spaced portions 186 which interconnect the legs 184. These legs receive and are clamped to the upper ends of vertical tubular guides 185, which also form part of the stationary part 56 of the master arm 51.

Figure 9:
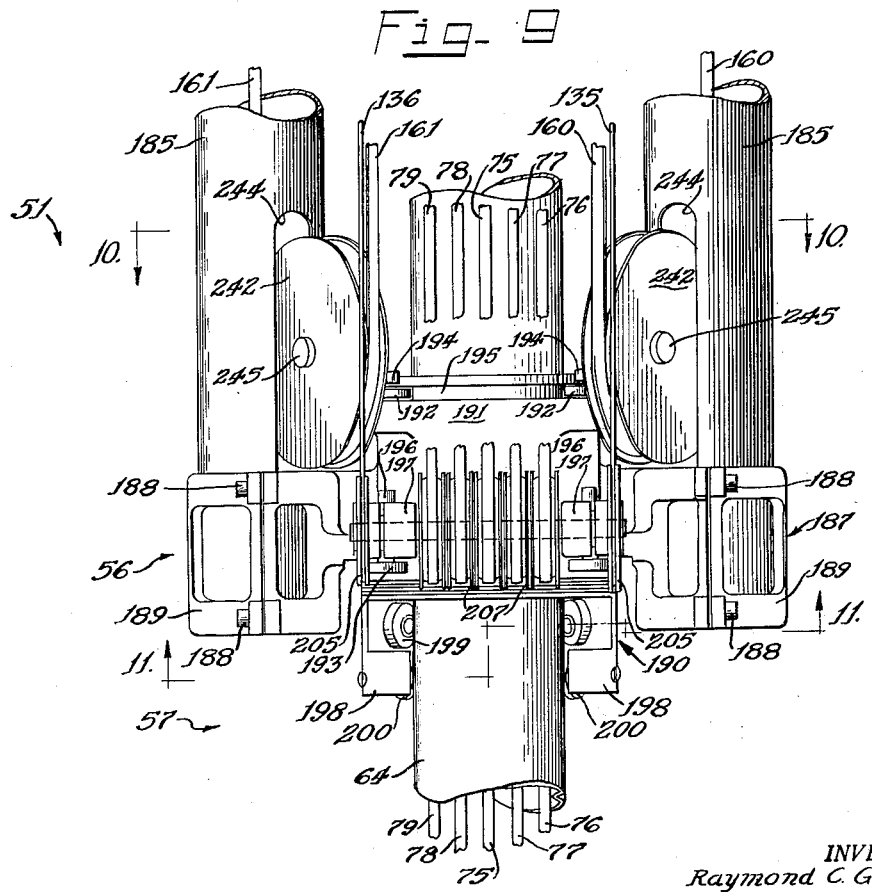
Fig. 9 is a fragmentary view showing the portion of the master arm within the area 9 in Fig. 2 but from the opposite side, i. e., the back, and more particularly, the lower end of a vertically fixed bracket and a part of a structure vertically movable therein.

As shown in Figs. 9, 10, and 11, a bracket 187 is secured to the lower ends of the tubular guides 185 by means of clamping screws 188 applied to clamping portions 189 of the bracket 187 which receive the tubular guides 185. A ring 190 is rotatably mounted in a central portion 191 of the bracket 187 by means of an upper set of three rollers 192 and a lower set of three rollers 193. The upper rollers 192 are mounted on headed members 194 attached to the bracket 187 and vertically support the ring 190 in the bracket 187 by running in a groove 195 formed in the portion of the ring 190 projecting above the bracket 187. The lower rollers 193 are mounted on shafts 196 carried in ears 197 of the bracket 187 and engage portions of the ring 190 extending below the bracket 187. The ring 190 has two axial extensions 198 each of which carries rollers 199 and 200 mounted on shaft 201. On each extension 198 the rollers 199 and 200 extend at right angles to one another and engage the sides of the grooves 71 formed in the tubular structure 64 forming a part of the movable part 57 of the master arm 51. Thus the rollers 199 and 200 constitute keys that permit axial movement of the tubular structure 64 with respect to the ring 190 while preventing rotational movement of the tubular structure with respect to the ring. The ring 190 has a take-up portion 202 which has two grooves receiving the end portions of the cables 135 and 136. As shown in Figs. 11 and 12, the ends of these cables are anchored to the ring 190 by members 203 which receive the ends of the cables and lie in openings 204 formed in the take-up portion 202. The cables 135 and 136 extend from the take-up portion 202 of the ring 190 over narrow grooved guide pulleys 205 and thence upwardly toward the pivot 58 of the master arm on the support. The pulleys 205 are journaled on a shaft 206 which is carried on the ears 197 of the bracket 187 and also journal five wide crowned guide pulleys 207. The tapes 76, 77, 78, 79, and 175 run over these pulleys.

As shown in Figs. 13, 14, and 15, the upper end of the tubular structure 64 for the master arm has its upper end secured to a reduced tubular extension 208 by means of rivets 209. The tubular extension 208 is journaled by means of ball bearings 210 in a head 211 which carries four rollers 212 which ride on the tubular guides 185 so as to permit the head 211 to have movement along the tubular guides while preventing the head from rotating with respect to the guides. The rollers 212 are journaled on shafts 213 which are mounted on bosses 214 on the head 211. The connection of the upper end of the tubular structure 64 on the master arm with the head 211 through the extension 208 and the bearings 209 is such as to permit rotational movement of the tubular guide with respect to the head while preventing axial movement of the tubular guide with respect to the head. A lower ring 215 is secured to the bottom of the head 211 to fix the lower bearing 210 within the head. An upper ring 216 which is secured to the top of the head 211 by screws 217 fixes the upper bearing 210 in the head. The reduced extension 208 is held against axial movement in the head 211 by virtue of engagement of the upper bearing 210 with a collar 216a secured to the extension 208 and engagement of the lower bearing 210 with a shoulder on the extension 208. The upper ring has upstanding posts 218 carrying a shaft 219 upon which five wide crowned guide pulleys 220 are journaled.

On the master arm 51 the tapes 76, 77, 78, 79, and 175 rise from the wrist joint (Figs. 4 and 5) through the tubular structure 64, pass around the pulleys 220 (Figs. 13, 14, and 15) at the head 211 forming the top of the movable part 57 of the master arm, descend to the pulleys 207 (Figs. 9, 10, and 11) at the bracket 187 forming the bottom of the stationary part 56 of the master arm, pass around these pulleys, and rise to the vicinity of the pivot 58 of the master arm 51 on the horizontal support 50.

A crossbar 221 is secured to the head 211 and provides at its ends adjustable mountings or connections for tapes 222 and 223. Such mountings or connections comprise screws 224 which pass through the ends of the crossbar 221 and are adjustably held thereagainst by nuts 225, threaded members 226 with bifurcated heads, threaded sleeves 227 adjustably connecting the threaded members 226 and the screws 224, and pins 228 which go through the bifurcated heading on threaded members 226 and through loops on the ends of the tapes 222 and 223. The tape loops are held in clamps 229. The tapes 222 and 223 extend upwardly from the crossbar 221 to and over wide crowned guide pulleys 230 mounted on shafts 231 carried by and between posts 232 formed on the upper end of the frame 181, as shown in Fig. 18. From the pulleys 230 the tapes 222 and 223 descend in the tubular guides 185 to counterweight assemblies 233 to which they are connected, as shown in Figs. 2, 16, and 39.

Each counterweight assembly comprises a counterweight proper 234, a casing 235 containing the same, end members 236 secured in the ends of the casing 235 by screws 237, and two sets of three rollers 238 which run on the interior of the tubular guide 185 to guide the counterweight assembly therein. The rollers 238 are mounted on posts 239 formed on the end members 236. The end members 236 have threaded openings 239a through which additional small counterweights may be inserted in the casing to supplement the counterweight proper 234. The openings 239a are closed by threaded plugs 239b. Loops maintained on the ends of the tapes 222 and 223 by clamps are pinned to bifurcated heads on threaded members 241 which are threaded through the upper end members 236 of the counterweight assemblies 233.

In similar fashion the tapes 160 and 161, which were previous mentioned in the description of the slave arm 52, are connected to the lower ends of the counterweight assemblies 233 and, as shown in Figs. 9 and 39, extend downwardly therefrom and around wide crowned guide pulleys 242 which extend through openings 244 formed in the lower end portions of the tubular guides 185. As shown in Figs. 10 and 11, the pulleys 242 are mounted on shafts 245 attached to extensions 246 formed on the bracket 187. From the pulleys 242 the tapes 160 and 161 extend upwardly to the region of the pivot 58 of the master arm 51 on the horizontal support 50.

Reference is now made to Figs. 18, 18a, and 19, wherein there are shown two sets 246 and 247 of wide crowned guide pulleys 170 and narrow grooved guide pulleys 171. The pulley sets 246 and 247 are similar to the pulley sets 168 and 169 shown in Figs. 31 and 32 in that each pulley set comprises seven wide crowned pulleys 170 and two narrow grooved pulleys 171 positioned at the ends of the wide pulleys. The pulley set 246 is located near the pivot 58 of the master arm 51 on the horizontal support 50 so that the upper peripheral portions of the pulleys 170 and 171 are tangent to the pivot axis 58 and a shaft 248 mounting the pulley set 246 lies directly below the pivot axis 248. The pulley set 247 lies somewhat below the pulley set 246 and laterally displaced from the pivot axis 58 of the master arm in the direction of the slave arm. The pulleys of set 247 are mounted on a shaft 249 which is carried on transverse extensions 250 formed integral with the base of the frame 181. The shaft 248 supporting the pulley set 246 has its ends mounted in blocks 251 which are set in recesses formed in inner members 252 of the legs 184 of the frame 181. The blocks 251 are held in place in the inner members 252 of the frame legs 184 by means of screws 253 which go through the blocks and have threaded engagement with said inner members. As shown in Figs. 36 and 38, the tapes 76, 77, 78, 79, and 175 rise from the pulleys 207 on the bracket 187 (Fig. 9) forming the lower end of the stationary part 56 of the master arm 51 to and over five wide pulleys 170 of the pulley set 247, thence to and over five wide pulleys 170 of the pulley set 246, and thence along and through the horizontal support 50 to and over five wide pulleys 170 of the pulley set 169 at the slave arm 52 (Fig. 32). As shown in Fig. 39, the tapes 160 and 161, which are attached to the lower ends of the counterweight assemblies 233 in the tubular guides 185 of the master arm 51 (Figs. 2 and 16), descend therefrom to and over the pulleys 242 mounted on the bracket 187 (Fig. 9) at the lower end of the stationary part 56 of the master arm 51, and thence upwardly to and over two wide pulleys 170 of the pulley set 247 (Figs. 18, 18a, and 19), thence to and over two wide pulleys 170 of the pulley set 246, and thence through and along the horizontal support 50 to two wide pulleys 170 at the slave arm (Fig. 32). As shown in Fig. 37, the cables 135 and 136 go from the rotatable ring 190 (Fig. 9) at the lower end of the stationary part 56 of the master arm to and over pulleys 205 adjacent the ring 190 and thence upwardly to and over the narrow pulleys 171 of the pulley set 247, thence to and over the narrow pulleys 171 of the pulley set 246, and thence along and through the horizontal support 50 to the narrow pulleys 171 of the pulley set 169 on the slave arm (Fig. 32).

As shown in Figs. 20, 21, and 22, a supplemental arm 254 is pivoted at its lower end by means of a ball bearing 255 on one of two hubs 256 of a bifurcated counterweight support 257. The upper end of the supplemental arm 254 is connected by means of ears 257a, an adjustable link 258, and an extension piece 259 with the upper end of the frame 181 on the master arm 51. The ears 257a are welded to opposite sides of the arm 254 and project therefrom in spaced relationship to one another toward the master arm 51. Extension piece 259 is secured by screws 259a to an upper portion of the frame 181 so as to project thereabove. The adjustable link 258 comprises a body member 260 and threaded eye members 261 which have adjustable threaded connections with the body member 260 so that the distance between the eyes of the members 261 can be varied to adjust the effective length of the adjustable link 258. The eye members 261 of the link 258 are pivotally connected to the ears 257a of the supplemental arm 254 by a pin 262 and to the extension piece 259 on the frame 181 by a post 263 secured to the extension piece. The support 257 has an upper flange 264 which directly carries a counterweight 265 which is attached to the flange 264 by means of nuts 266 embedded in the counterweight and bolts 267 going through the flange 264 and threaded into the nuts 266. The counterweight support 257 is pivotally carried on the legs 177 of the horizontal support 50 by means of ball bearings 268 and threaded stub shafts 269 which have threaded engagement with the legs 177.

The counterweight support 257 has a lateral extension 270 at its lower end to which one end of a power-operated adjustor 271 is pivotally connected by a pin 272, the said end of the adjustor being relatively thin and being received in a slot in the extension 270. The upper end of the adjustor 271 is pivotally connected by a pin 273 to and between the ears 257a on the supplemental arm 254.

The power-operated adjustor 271 may comprise essentially a motor positioned within a housing behind a control box 275 for the motor, reduction gearing located in a box 276, a long rotatable nut driven by the motor through the reduction gearing, and a nonrotatable screw engaged by the nut. The adjustor 271 may also include a clutch that is automatically disengaged to break the driving connection between the motor and the nut when the motor is not being driven and a brake that automatically holds the nut against rotation when the clutch is disengaged. The adjustor 271 is operated from a switch 276a which, as shown in Figs. 2, 10, and 11, is mounted on the bracket 187 and is connected with the control box 275 through a plurality of lines 276b. The adjustor 271 is operated to vary the distance between its connections 272 and 273 with the counterweight support 257 at the lower end and the supplemental arm 254 at the upper end, so that the counterweight 265 may be alongside the supplemental arm 254 as shown in Figs. 20 and 22, or may be lowered to the position of Fig. 21 in which it is located on the side of the master arm 51 away from the supplemental arm 254. In moving between the two positions depicted in Figs. 20 and 21, the counterweight 265 goes between the legs 184 of the frame 181 on the upper end of the master arm 51. The counterweight support 257 is specially shaped so that the counterweight 265 may go to the extreme position of Fig. 21; more particularly, the upper vertical part of the counterweight support 257 directly below the flange 264 comprises a web 277 which is sufficiently offset from the counterweight 265 as to permit the counterweight to move to a level between the upper and lower portions 186 of the base of the frame 181, while the web 277 moves into engagement with the upper member 186 of the frame base.

The counterweight support 257, which is a casting, is bifurcated so as to receive in pivotal connections upper and lower yokes 278 and 279 secured respectively to the ends of upper and lower links 280 and 281. The yokes 278 and 279 are connected with the counterweight support 257 in the manner illustrated for the yoke 279 in Fig. 22, namely, through a shaft 282 fixed to the yoke and ball bearings 283 journaling the ends of the shaft 282 in legs 283a of the bifurcated counterweight support 257. The support 257 includes a reinforcing cross brace 283b which is shown in Fig. 20 and interconnects the lower portions of the legs 283a. The links 280 and 281 extend from the yokes 278 and 279 adjacent the master arm 51 through and along the horizontal support 50 to the slave arm 52 where, as shown in Fig. 32, they are secured respectively to yokes 284 and 285. The yokes 284 and 285 are pivotally connected respectively above and below the pivot 61 of the slave arm 52 on the horizontal support 50 on the vertical side pieces 115 of the framework 116 by means of pins or shafts 286 and 287, which are journaled in the side pieces 115 by means of ball bearings 288, as indicated for the shaft 286 in Fig. 33. The connections of the links 280 and 281 with the yokes at their ends are adjustable, and it is intended that the links 280 and 281 be placed under tension so that it is feasible for them to be formed of tubular rods as shown in Fig. 32.

When the master arm 51 is angularly shifted about its pivot 58, the slave arm 52 will follow the master arm in similar angular motion, because of the interconnection of the arms through the links 280 and 281, the counterweight support 257, the adjustor 271 acting as a link of fixed length between the pivots 272 and 273, the supplemental arm 254, and the link 258. When the slave arm 52 is to be angularly adjusted with respect to the master arm 51, the adjustor 271 is actuated to change the distance between the pivotal connections 272 and 273. This results in a shifting of the counterweight support 257 with respect to the supplemental arm 254 and the master arm 51, and the counterweight support 257 acts through the links 280 and 281 to shift the slave arm. It will be noted, of course, that the counterweight 265 shifts with its support 257 and with the slave arm 52, thus counterbalancing the movement of the slave arm with respect to the master arm.

As is evident from the foregoing description, the master arm 51 and the slave arm 52 are interconnected by cables 135 and 136 and tapes 160, 76, 77, 175, 78, 79, and 161, so that the motions of the handle 62 on the master arm are reproduced by the grasper 63 on the slave arm. Six motions of the handle 62 are reproduced by the grasper 63. They are opening and closing, movement along the master or slave arm toward the pivot on the horizontal support, rotation of the handle or the grasper about the lower end of the master or slave arm on an axis contained in the trunnions 95 of the yoke 94 (Figs. 4 and 5), rotation of the handle or grasper about the lower end of the master or slave arm about an axis contained in the shaft 97 of the yoke 94 (Figs. 4 and 5), "azimuth" motion involving rotation of the handle or grasper about the axis of the master or slave arm, and bodily movement of the handle or grasper resulting from pivoting of the master or slave arm on the support. There is a seventh motion provided by angular movement of the horizontal support 50 in the tube 54. In addition, indexing is obtained by angular movement of the slave arm with respect to the master arm produced by actuation of the power-operated adjustor 271.

Reference is now made to Figs. 36–39 in conjunction with which a detailed description will now be given of the manner in which the aforesaid motions take place. The master arm 51 comprises the stationary part 56 and the movable part 57 which shifts therealong toward and away from the pivot 58 between the master arm and the horizontal support 50, or more particularly, between the stationary part 56 and the horizontal support 50. It will be evident from Fig. 2 that the pivot 58 is much nearer the upper end of the stationary part 56 formed by the frame 181 than the lower end of the movable part formed by the bracket 187. Thus for convenience of description, the upper end of the stationary part 56 is referred to as the near end and the lower end, as the distant end, and thus the guide pulleys 230 (Fig. 39) which are mounted on the upper end of the frame 181 at the upper end of the stationary part 56 may be called the near outer guides or guide means, and the guide pulleys 242 (Fig. 39) and the guide pulleys 207 (Figs. 36 and 38), which are mounted on the bracket 187 at the lower end of the stationary part 56, may be called the distant outer guides or guide means. The guide pulleys 170 and 171 of the sets 246 and 247 (Figs. 36–39) which are mounted on the stationary part 56 of the master arm near the pivot 58 are called inner guides or guide means. As is evident from Fig. 2, the movable part 57 of the master arm runs up and down the stationary part 56, with the head 211 at the top of the movable part 57 running between the pivot 58 and the bracket 187 at the lower end of the stationary part 56. Thus the guide pulleys 230 (Figs. 36 and 38) which are mounted on the head 211 always lie between the inner guide means 246 and 247 and the distant outer guide means 207 and are called intermediate guide means. On the slave arm 52 the pulleys 170 and 171 of the sets 168 and 169 (Figs. 36–39), being adjacent the pivot 61 of the slave arm, are called inner guide means, and the guide pulleys 162 (Fig. 39), being on the end of the stationary part 60 of the slave arm spaced from the pivot 61 of the slave arm, are called outer guide means.

As shown in Fig. 36, opening and closing of the handle 62 is transmitted through the cables 107 and the tape 175 to produce opening and closing of the grasper 63.

As shown in Fig. 37, rotational movement of the handle 62 about the master arm 51 as an axis is transmitted through the rotatable ring 190 mounted in the bracket 187 of the movable part 56, the cables 135 and 136 and the rotatable ring 127 mounted at the bracket 125 on the stationary part 59 of the slave arm 52 so that rotational movement of the grasper 63 about the axis of the slave arm 52 is produced. The ring 190 on the master arm 57 is rotated by rotation of the handle 62 and the ring 127 on the slave arm 52 rotates the grasper 63, because, as shown in Figs. 9 and 11, the tubular structure 64 carrying the handle 62 is keyed to the ring 190 through the grooves 71 in the tubular structure 64 and the rollers 199 and 200 mounted on the ring 190 and running in the grooves 71, and because, as shown in Figs. 29 and 30, the tubular structure 64 carrying the grasper 63 is keyed to the ring 127 through the grooves 71 on the tubular structure 64 and the rollers 144 mounted on the ring 127 and running in the grooves 71.

As shown in Figs. 4, 5, and 38, rotation of the handle 62 about the lower end of the master arm 51 on the axis contained in the trunnions 95 of the yoke 94 causes rotation in the same direction of the take-up sections 75 of the master arm, which rotation is transmitted through the tapes 76, 77, 78, and 79 to the take-up sections 75 of the slave arm which are caused to rotate in the same direction and thus to produce rotation of the grasper 63 about the lower end of the slave arm corresponding to the rotation of the handle 62 about the lower end of the master arm. If, however, the handle 62 is rotated about the shaft 97 of the yoke 94 at the lower end of the master arm, the take-up sections 75 on the master arm rotate in opposite directions and cause the tapes 76, 77, 78, and 79 to make the take-up section 73 on the slave arm rotate in opposite directions. Consequently, the grasper 63 rotates about the lower end of the slave arm in the manner of the handle 62 about the lower end of the master arm.

Reference is now made to Fig. 39 for a showing of how the master and slave arms 51 and 52 are counterweighted and how they are interconnected for conjoint movement of the movable parts 57 and 60 along the stationary parts 56 and 59. If an operator transmits a downward movement to the movable part 57 of the master arm through the handle 62, the head 211 at the upper end of the movable part moves downward. Such downward movement of the head is transmitted through the tapes 222 and 223 running over the near outer guide means 230 at the upper end of the stationary part 56 of the master arm to the counterweights 233 which are caused to move upward to balance the downward movement of the movable part 57 of the master arm. The upward movement of the counterweights 233 is transmitted to the tapes 160 and 161 which run over the distant outer guide means 242 and the inner guide means 170 on the master arm and the inner guide means 170 and the outer guide means 162 on the slave arm to the head 147 on the movable part 60 of the slave arm. Consequently, the tapes 160 and 161 are pulled along the support 50 toward the master arm and pull the movable part 60 of the slave arm downward. When the operator moves the movable part 57 of the master arm upward, the counterweights 233 move downward under their own weight and permit the tapes 160 and 161 to move back toward the slave arm 52 and allow the movable part 60 of the slave arm to move upward. Since the tapes 160 and 161 are flexible, they of course will not push the movable part 60 of the slave arm upward. Instead such upward movement on the slave arm is produced by the tapes 76, 77, 78, and 79 and the take-up devices 75 in the manner shown in Fig. 38. When the movable part 57 on the master arm is moved upward, the intermediate guide means 220 mounted thereon move upward away from the distant outer guide means 207 on the master arm. Increasing the spacing between the outer guide means 207 and the inner guide means 220 causes the tapes 76, 77, 78, and 79 to be pulled along the horizontal support 50 from the slave arm to the master arm, causing the take-up sections 75 and the movable part 60 of the slave arm upon which they are mounted to move upward.

Shifting of the movable parts 57 and 60 up and down the stationary parts 56 and 59 of the master and slave arms 51 and 52 will be without effect on the degree of opening or closing of the handle 62 and the grasper 63 and on angular positions of the handle and the grasper with respect to the master and slave arms. When the movable parts 57 and 60 go up or down, then, as shown in Fig. 36, the guide pulley 220 on the movable part 57 on the master arm moves away or toward the distant outer guide means 207 whereby the cables 107 and the tapes 175, which interconnect the handle 62 and the grasper 63, move away from the slave arm and away from the master arm or away from the master arm and toward the slave arm to the same extent that the handle 62 and the grasper 63 move up or down, and there is no shifting of the cables 107 and the tape 175 with respect to the handle and the grasper, which shifting would change the degree of opening or closing of the handle and the grasper. Also, when the movable parts 57 and 60 go up or down, then, as shown in Fig. 38, the increase or decrease in the spacing between the guide pulleys 220 on the movable part 57 of the master arm results in a shift of the tapes 76, 77, 78, and 79 toward or away from the master arm to the extent that the master and slave arms move up or down, and moreover the tapes 76, 77, 78, and 79 shift conjointly and not with respect to one another. Thus there is no rotation of the take-up sections about their own axes, and consequently there is no rotation of the handle 62 and the grasper 63 about the lower ends of the master and slave arms about the axes of the trunnions 95 or the shafts 97 of the yokes 94 (Fig. 5).

When the master arm 51 is swung about its pivot 58 on the support 50, the slave arm 52 moves in similar fashion about its pivot 61 on the support 50, because of the interconnection of the master and slave arms through the links 280 and 281, the counterweight support 257, the adjustor 271, the supplemental arm 254, and the link 258, as shown in Figs. 1, 20, and 32. Such conjoint swinging movement of the master and slave arms does not produce movements of the handle 62 and the grasper 63 with respect to the arms, because the tapes and cables interconnecting the handle and the grasper pass over guide pulleys 170 and 171 of sets 169 and 170 near or at the pivots 58 and 61 of the master and slave arms 51 and 52 on the support 50, as shown in Figs. 18 and 32, and thus conjoint swinging movement of the master and slave arms does not produce shifting of the tapes and cables along the arms and the support which shifting is required for the aforesaid movements of the handle and grasper.

There is no rotation of the handle 62 and the grasper 63 about the axes of the master and slave arms 51 and 52 when the movable parts 57 and 60 of the master and slave arms move up or down, because the interconnection of the handle and grasper for the aforesaid rotation includes not only the cables 135 and 136 and the rings 127 and 190, shown in Fig. 37, but also the tubular structures 64, the grooves 71 therein, and the rollers 144, 199, and 200 running in the grooves, as shown in Figs. 10, 12, 29, and 30, which permit vertical movement of the tubular structures 64 with respect to the rings 127 and 190 while assuring rotation of the tubular structures with the rings. Conversely, rotation of the handle 62 and the grasper 63 about the axes of the master and slave arms 51 and 52 produces very little if any rotation of the handle and the grasper about the axes at the lower ends of the arms contained in the yokes 94, in spite of the fact that, as shown in Fig. 38, the axes of the takeup sections 75, which cooperate with the tapes 76, 77, 78, and 79 to produce the last mentioned rotation of the handle and the grasper, will shift angularly with respect to the axes of the pulley set 168 and the axes of the pulleys 220 over which these tapes pass. This is so because on the master arm there is a relatively great fixed distance between the guide pulleys 220 and the take-up sections 75, and on the slave arm the distance between the take-up sections 75 and the guide pulleys 170 of the set 168, though variable, remains relatively great, being about equal to the distance from the take-up sections 75 on the master arm to the inner guide means 170 of the set 247 which distance never becomes less than the relatively great distance between the pulleys 170 of set 247 (inner guide means) and the pulleys 207 (distant outer guide means) on the master arm. Similarly, because of the aforementioned relatively great distances angular shifting of the axes of the take-up sections 75 which is involved in angular shifting of the handle 62 and the grasper 63 about the axes of the master and slave arms will produce very little if any movement of the tapes 76, 77, 78, and 79 between the master and slave arms and thus no movement of the movable parts 57 and 60 with respect to the stationary parts 56 and 59 of these arms. Angular shifting of the handle 62 and the grasper 63 about the axes of the master and slave arms will also be without effect upon the relative positions of the movable parts 57 and 60 of the master and slave arms, because the tapes 160, 161, 222, and 223, which are used to shift the movable parts of the arms along the stationary arms, are guided, as shown in Fig. 39, over pulleys 162, 170, 232, and 242 and are connected to heads 147 and 211 and counterweights 233, no one of which rotates when the handle 62 and the grasper 63 are rotated about the axes of the master and slave arms. The latter rotation is also without effect on the degree of opening or closing of the handle and the grasper, not only because the pulleys 105 (Fig. 36) which guide the cables 107 used with the tape 175 to interconnect the handle and grasper for opening and closing are, like the take-up sections 75 (Fig. 38), located at relatively great distances from the guide pulley 220 on the master arm and the guide pulley 170 of the set 168 on the slave arm, but also because the pulleys 105 are centrally located about on the axes of the master and slave arms.

The master and slave arms 51 and 52 may be operated parallel to one another, as shown in Fig. 1, or the slave arm 52 may be angularly adjusted with respect to the master arm 51 by actuation of the power-operated adjustor 271 for a variety of purposes. When the manipulator is being installed, the slave arm is adjusted so as to be brought into alignment with the horizontal support 50 so that the slave arm may be inserted through the tube 54 and the shielding wall 53. Now the slave arm 52 is brought into parallelism with the master arm 51 or to some condition near parallelism. Since the master and slave arms are relatively long, some relatively small angular adjustment of the slave arm with respect to the master arm will change the distance between the handle 62 and the grasper 63 an appreciable amount, thus in effect causing the grasper 63 to move away from the handle 62 and farther into the dangerous area in which it operates or toward the handle and nearer the shielding wall 54. The provision for angular adjustment of the slave arm with respect to the master arm dispenses with a need for a more complicated construction of the horizontal support 50 that would involve adjustment of the length of the horizontal support or adjustment of the distance between the pivots 58 and 61 of the master and slave arms on the horizontal support.

The two counterweights 233 which move up and down as the movable parts 57 and 60 of the master and slave arms move down and up counterbalance both arms, even though the two counterweights are located on the master arm, more particularly in the tubular guides 185 of the stationary part 56 of the master arm (Fig. 2). The stationary parts 56 and 59 of the master and slave arms are counterbalanced by counterweights 265, 288, and 289 located at the upper or near end of the master arm 51. As shown in Figs. 2 and 18, the counterweight 288 is secured to the extension 259, and the counterweight 289 is secured to an extension 290 which is located on the opposite side of the master arm and secured to one leg 184 of the frame 181. The counterweight 288 is relatively thin and thus relatively light while the counterweight 289 is relatively thick and thus relatively heavy so that a lateral balance is achieved in spite of the imbalance that would otherwise be imposed by the linear adjustor 271, the supplemental arm 254, and the link 260 connecting the supplemental arm and the upper end of the master arm 51. Angular movement of the slave arm with respect to the master arm does not appreciably disturb balance, because of the counterweight 265, which pivots along with the slave arm 51 when the latter is caused by the adjustor 271 to pivot with respect to the master arm 51. Counterweight 265 is also located adjacent the master arm 51. Thus there are no counterweights on the slave arm 52, and the construction can be relatively simple and take up little space; thus as shown in Fig. 3, the slave arm comprises, except at its ends, the single tubular guide 122 and the tubular structure 64 which slides within it. This is in contrast with the master arm 51 which, as shown in Fig. 2, comprises two spaced tubular guides 185 in which the counterweights 233 move up and down and the tubular structure 64 running between the tubular guides 185. Moreover, the slave arm 52 is somewhat simpler than the master arm 51 in that no portion of the slave arm extends above the horizontal support 50. Thus the slave arm 52 is as narrow as the horizontal support 50 and can be pivoted into alignment with it so as to be capable of being inserted through the tube 54 mounting the horizontal support 50 in the shielding wall 53 for installation of the manipulator as a complete assembly entirely from the side of the shielding wall 53 on which the master arm is to operate.

When the slave arm 52 is adjusted with respect to the master arm 51, there is some need to be concerned about maintaining the tightness of the tapes and cables interconnecting the master and slave arms. It will be seen from Fig. 32 that the pivot axis 61 of the slave arm 52 on the support 50 is approximately tangent to the guide pulleys 170 and 171 of the set 169 at the upper portion thereof and, being to the left of the shaft 172 mounting the pulley set 169, is slightly farther from the master arm 51 than the shaft 172 when the slave arm 52 is vertical or perpendicular to the horizontal support 50. Thus the greatest degree of tightness in the tapes and cables interconnecting the master and slave arms exists when the slave arm 52 is displaced about 15° to the left from the vertical position of Fig. 32 and loosens only a limited amount in the various other positions between the vertical and horizontal positions. What happens in the change from the aforesaid position 15° away from vertical is that the amount of wrap of the tapes and cables about the pulley set 169 decreases or increases and the shift of the point of first contact with the pulley set 169, of the horizontal stretch of the pulleys and tapes coming from the horizontal support compensates for the decrease or increase in wrap of the cables and tapes about the pulley set 169.

The same general relationship exists for the guide pulleys 108 and the grasper 63 for opening and closing them, as shown in Figs. 4 and 5. Thus the axes of the guide pulleys 108 are related to the axes of the trunnions 95 of the yoke 94 upon which the guide pulleys 108 are mounted in such a way that the cable is tightest in the straight position shown in Fig. 4 and in the two extreme positions displaced approximately 90° in either direction from the straight position shown, and the amount of loosening of the cables 107 in the intermediate positions is relatively small.

Each of the guide pulleys 162, 170, 207, 220, 230, and 242 are wide crowned pulleys on which the distance between the side flanges is greater than the width of the tapes running on the pulleys. The crown of the pulleys and this greater width cause the tapes to be centered between the pulley flanges and to avoid contact with them which would otherwise increase the friction between the tapes on the pulleys.

In the modified construction illustrated in Fig. 40, pulleys 170 and 171 for the sets 169 are journaled by ball bearings 173 on a shaft 291 which, instead of being fixed like the shaft 172 in Fig. 35, is journaled near its ends in the blocks 174 by means of ball bearings 292. One end of the shaft 291 projects exteriorly of one side piece 115 and carries a drive gear 293 keyed to the shaft 291. In this arrangement the pulleys 170 and 171 may rotate with respect to the parts in which it is mounted. It is intended that the shaft 291 be oscillated from a suitable source of power (not shown) connected with the drive gear 293 through a suitable angle such as 60° at about 14 cycles/sec. Oscillation of the shaft 291 will reduce the friction of the pulleys 170 and 171 upon the shaft. It is intended that the same construction and arrangement be applied to the shafts supporting the pulleys 170 and 171 of sets 168, 169, 246, and 247, the pulleys 220, and the pulleys 207.

The intention is to limit the invention only within the scope of the appended claims.

What is claimed is:

1. A remote-control manipulator comprising a support; a pair of arms positioned at regions of the support spaced lengthwise thereof and extending generally transversely thereof, each arm comprising a stationary part connected to one of said regions for swinging about a pivot axis transverse to the length of the support and having inner guide means adjacent said pivot axis, and a movable part mounted on the stationary part for movement therealong transverse to said pivot axis and having take-up devices located adjacent one end of the movable part, a mounting member carried by said end of the movable part for movement about two axes therein, means connecting the mounting member with the take-up devices to cause rotation of the mounting member about one of its axes to move the take-up devices in the same direction and rotation of the mounting member about the other of its axes to move the take-up devices in opposite directions, one arm further comprising an outer guide means carried by the stationary part of said arm and an intermediate guide means carried by the movable part of said arm, the intermediate guide means lying between the outer guide means, and the inner guide means associated with the said one arm; a tool carried by one mounting member; a handle carried by the other mounting member; and two pairs of flexible ties enabled by movements in the directions of their lengths to transmit the aforesaid rotations of the mounting member carrying the handle to the mounting member carrying the tool, said pairs of flexible ties being connected to the take-up devices on the two arms for being taken up and let out thereby and extending from the take-up devices on the said one arm to and over the intermediate guide means thereon, thence to and over the outer guide means thereon, thence to and over the inner guide means thereon, thence to and over the inner guide means on the other arm, and thence to the take-up devices thereon.

2. A manipulator as specified in claim 1, the handle being associated with the arm carrying the intermediate and outer guide means, the tool being a grasper and being associated with the other arm.

3. A remote-control manipulator comprising an intermediate support; a pair of arms positioned at regions of the support spaced lengthwise thereof and extending generally transversely thereof, each arm comprising a stationary part connected to one of said regions for swinging about a pivot axis transverse to the length of the intermediate support and having an inner guide adjacent its pivot axis, and a movable part mounted on the stationary part for movement therealong transverse to said pivot axis; a handle mounted on the movable part of one arm to one side of the pivot axis of said one arm; a tool mounted on the movable part of the other arm to one side of the pivot axis of the said other arm; an outer guide mounted on the stationary part of one arm on the same side of its pivot axis as the handle or tool associated with the said one arm; an intermediate guide mounted on the movable part of the said one arm between the outer guide and the inner guide on the said one arm; and flexible tie means connecting the handle and the tool and extending therebetween along the support and the arms, the portions of the means on said one arm going from the associated inner guide, thence to the outer guide, thence to the intermediate guide, and thence to the tool or handle on the said one arm, the portion of the tie means on the other arm going directly from the associated inner guide to the handle or tool on the said other arm.

4. A manipulator as specified in claim 3, the handle being associated with the arm having the outer and intermediate guides, the tool being a grasper and being associated with the other arm.

5. A remote-control manipulator comprising a horizontal support; a master arm; and a slave arm; said arms being positioned at regions of the support spaced lengthwise thereof and extending generally transversely thereto and downwardly therefrom, each arm comprising a stationary part connected to one of said regions for swinging about an axis transverse to the length of the support and a movable part mounted on the stationary part for movement therealong transverse to said pivot axis, the stationary part of the slave arm extending substantially only in one direction from its pivot axis on the support and carrying an inner guide adjacent said pivot axis, and an outer guide adjacent the end of the arm remote from said pivot axis, the stationary part of the master arm extending for a great distance from its pivot axis on the support in the same direction as the stationary part of the slave arm so as to terminate in a distant end carrying a distant outer guide on the same side of the support as the stationary part of the slave arm, the stationary part of the master arm also extending for a short distance from its pivot axis on the support in the opposite direction so as to terminate in a near end carrying a near outer guide on the opposite side of the support from the distant guide; counterweights for the master and slave arms slidably mounted on the stationary part of the master arms; flexible tie means connected to the movable part of the slave arm and extending therefrom to and over the outer guide thereon, thence to and over the inner guide thereon, thence along the support to and over the inner guide on the master arm, thence to and over the distant outer guide, thence to a connection with the counterweights, thence to and over the near outer guide, and thence to the movable part of the master arm; and link means interconnecting the master and slave arms to assure their conjoint angular movement.

6. The manipulator specified in claim 5, and further comprising a handle connected to the movable part of the master arm adjacent the distant outer guide, a grasper connected to the movable part of the slave arm adjacent the outer guide, and means for adjusting the link means between the arms to vary the angular relationship of the arms for adjusting the spacing between the handle and the grasper and to enable the slave arm to be angularly shifted into alignment with the support for installation and removal of the manipulator.

7. A remote-control manipulator comprising a horizontal support; a vertical slave arm having a gripper; and a vertical master arm having a handle; said arms being positioned at regions of the support spaced lengthwise thereof and extending generally transverse thereto, each arm comprising a stationary part connected to one of said regions for swinging about a pivot axis transverse to the length of the support, a first take-up device mounted on the lower end of the stationary part so as to be held against movement along the stationary part transverse to the pivot axis while being permitted rotation about the arm as an axis to provide the handle or gripper with such rotation, and a movable part mounted on the stationary part for movement therealong transverse to the pivot axis of the stationary part and comprising a rotatable section keyed to the first take-up device so as to rotate therewith while being permitted movement along the stationary part and with respect to the first take-up device and a nonrotatable section connected to the upper end of the rotatable section so as to move with the same along the stationary part; each arm further comprising second and third take-up devices located adjacent the lower end of the movable part, means connecting the second and third take-up devices with the handle or the gripper for causing rotation of the second and third take-up devices in the same direction to swing the handle or the gripper about one axis in the arm and rotation of the second and third devices in opposite directions to swing the handle or gripper about another axis in the arm, inner guide means adjacent the pivot axis of the arm on the horizontal support, and an outer guide means adjacent the lower end of the stationary part; the master arm also having an intermediate guide means positioned on the nonrotatable sections of the movable part; a first pair of flexible ties connected to the first take-up devices and extending therebetween along the horizontal support and the arms, the portions of the first pair on each arm extending directly from the first take-up device thereon to the inner guide means thereon; and second and third pairs of flexible ties connected to the second and third take-up devices and extending therebetween along the horizontal support and the arms, the portions of said second and third pairs on the slave arm extending directly from the second and third take-up devices thereon to and over the inner guide means on the slave arm, the portions of said second and third pairs on the master arm extending indirectly from the second and third take-up devices thereon by way of the intermediate guide means on the movable part and the outer guide means on the stationary part.

8. The manipulator specified in claim 7, the stationary part of the slave arm being tubular and receiving within it the movable part of the slave arm, the manipulator further comprising two movable counterweights for the master and slave arms, the stationary part of the master arm comprising spaced parallel tubular guides housing the movable counterweights, the movable part of the master arm being positioned parallel to and between the said tubular guides.

9. The manipulator specified in claim 8, the movable part of the master arm also comprising two sets of rollers mounted in the non-rotatable section and engaging the exteriors of the tubular guides so as to roll therealong for enabling the movable part of the master arm to move axially of the tubular guides while preventing rotation of said non-rotatable section, the stationary part of the master arm further comprising a bracket interconnecting the lower ends of the tubular guides and journalling the said first take-up device of the master arm.

10. A remote-control manipulator comprising a support; master and slave arms associated with the support at regions spaced lengthwise thereof, each arm comprising a stationary part having a pivotal connection with the support and extending generally transversely thereof and a movable part mounted in the stationary part so as to be movable therealong toward and away from said pivotal connection and so as to pivot conjointly with the stationary part with respect to the support; tools carried by the movable parts of the master and slave arms; and tie means interconnecting the tools for causing opening, closing, and rotations of the one tool about axes thereof to produce corresponding operations of the other tool, said tie means going along the arms and the support and proceeding directly on one arm from the tool thereon to the pivotal connection thereof with the support and proceeding on the other arm from the tool thereon toward the pivotal connection, thence away from the pivotal connection, and thence toward the pivotal connection; whereby movement of the stationary parts along the movable parts causes an increase or decrease in the length of the tie means extending along one arm and a matching decrease or increase of the length of the tie means extending along the other arm and consequently is without effect in the aforesaid opening, closing, and rotations of the tools.

11. The remote-control manipulator specified in claim 10, and further comprising link means interconnecting the master and slave arms to enable them to pivot conjointly with respect to the support, and means located adjacent the connection of the stationary part of the master arm with the support for adjusting the link means to cause the slave arm to pivot on the support independently of the master arm.

12. A remote-control manipulator comprising a horizontal support; a master arm; and a slave arm; said arms being positioned at regions of the support spaced lengthwise thereof and extending generally transversely thereto and downwardly therefrom, each arm comprising a stationary part connected to one of said regions for swinging about an axis transverse to the length of the support and a movable part mounted on the stationary part for movement therealong transverse to said pivot axis; a handle and a grasper connected respectively to the master arm and the slave arm at the lower ends of the movable parts thereof; tie means interconnecting the handle and the grasper and extending along the arms and the support for causing motions of the handle to be reproduced by the grasper; movable counterweights for the master and slave arms mounted on the stationary part of the master arm for movement therealong and being inserted in a certain portion of said tie means; said certain portion on the slave arm extending from the upper end of the movable part to the lower end of the stationary part and thence to the horizontal part; said certain portion on the master arm extending from the upper end of the movable part to the upper end of the stationary part, thence to the movable counterweights, thence to the lower end of the stationary part, and thence to the horizontal support.

13. A master arm for a remote-control manipulator, comprising a stationary part adapted to be pivotally connected to a support, and a movable part mounted on the stationary part for movement therealong toward and away from the pivotal connection of the stationary part with the support, said stationary part comprising two spaced tubular guides adapted to house movable counterweights and a rotatable member mounted on and between the lower ends of the tubular guides, said movable part comprising an elongated rotatable section keyed to the rotatable member so as to rotate therewith and to be shiftable axially with respect thereto, a non-rotatable section connected with the upper end of the rotatable section so as to be shiftable conjointly with the rotatable section, and two pairs of rollers mounted on the non-rotatable section and engaging the tubular guides externally so as to prevent rotation of the non-rotatable section and to provide for axial movement of the rotatable and non-rotatable sections, and a handle mounted on the lower end of the rotatable section.

14. A remote-control manipulator comprising a horizontal support, master and slave arms connected to the support at regions spaced lengthwise thereof for pivoting with respect to the support, a handle and a grasper connected with the master and slave arms, respectively, tie means interconnecting the handle and the grasper for causing movements of the handle to be reproduced by the grasper, link means interconnecting the arms for causing the arms to pivot conjointly with respect to the support, and means for adjusting the link means to vary the angular relationship between the arms for adjusting the spacing between the handle and the grasper and to enable the slave arm to be angularly shifted into alignment with the support for installation and removal of the manipulator.

15. The manipulator specified in claim 14, the means for adjusting the link means being located adjacent the connection of the support and the master arm.

References Cited in the file of this patent
UNITED STATES PATENTS
2,476,249  Payne  _____ July 12, 1949